(12) United States Patent
Kobayashi

(10) Patent No.: US 11,126,726 B2
(45) Date of Patent: Sep. 21, 2021

(54) INFORMATION PROCESSING APPARATUS, CONTROL METHOD THEREOF, AND PROGRAM STORAGE MEDIUM

(71) Applicant: CANON KABUSHIKI KAISHA, Tokyo (JP)

(72) Inventor: Yo Kobayashi, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 352 days.

(21) Appl. No.: 16/217,210

(22) Filed: Dec. 12, 2018

(65) Prior Publication Data

US 2019/0188388 A1 Jun. 20, 2019

(30) Foreign Application Priority Data

Dec. 20, 2017 (JP) .............................. JP2017-243940

(51) Int. Cl.
*G06F 21/57* (2013.01)
*G06F 21/55* (2013.01)
*G06F 9/4401* (2018.01)

(52) U.S. Cl.
CPC .......... *G06F 21/575* (2013.01); *G06F 9/4401* (2013.01); *G06F 21/554* (2013.01); *G06F 2221/034* (2013.01)

(58) Field of Classification Search
CPC .... G06F 21/575; G06F 9/4401; G06F 21/554; G06F 2221/034; G06F 21/57; G06F 21/64; G06F 9/4406
USPC .......................................................... 726/23
See application file for complete search history.

(56) References Cited

U.S. PATENT DOCUMENTS

| | | | | |
|---|---|---|---|---|
| 5,220,275 A | * | 6/1993 | Holmqvist | G01R 25/00 324/76.77 |
| 6,560,706 B1 | * | 5/2003 | Carbajal | G06F 9/4416 713/155 |
| 7,249,249 B2 | * | 7/2007 | Freeman | G06F 9/4406 713/1 |
| 8,788,839 B1 | * | 7/2014 | Dong | G06F 21/575 713/187 |
| 9,147,075 B1 | * | 9/2015 | Litvin | H04L 9/3247 |
| 9,251,343 B1 | * | 2/2016 | Vincent | G06F 21/566 |
| 9,459,882 B2 | * | 10/2016 | Lee | G11C 29/4401 |
| 9,734,339 B2 | | 8/2017 | Jeansonne et al. | |
| 2002/0099949 A1 | * | 7/2002 | Fries | H04N 7/163 726/24 |
| 2002/0126792 A1 | * | 9/2002 | Fuhrmann | G06K 19/07372 377/1 |
| 2004/0030877 A1 | * | 2/2004 | Frid | G06F 8/654 713/1 |
| 2004/0034823 A1 | * | 2/2004 | Watkins | G06F 21/71 714/724 |

(Continued)

*Primary Examiner* — Shahriar Zarrineh
(74) *Attorney, Agent, or Firm* — Rossi, Kimms & McDowell LLP

(57) ABSTRACT

A verification circuit provided in an information processing apparatus verifies the presence or absence of the tampering of a boot program stored in a memory. A monitoring circuit monitors a signal communicated between the verification circuit and the memory and detects that the start-up of a system has failed due to the tampering of the boot program based on a monitoring result of the signal. Subsequently, the monitoring circuit provides notification of information related to a cause of failure of the start-up of the system.

12 Claims, 13 Drawing Sheets

(56) References Cited

U.S. PATENT DOCUMENTS

| | | | |
|---|---|---|---|
| 2004/0143710 A1* | 7/2004 | Walmsley | B41J 2/04508 711/144 |
| 2005/0138409 A1* | 6/2005 | Sheriff | G06F 21/575 726/26 |
| 2007/0069875 A1* | 3/2007 | Doi | G06F 21/554 340/440 |
| 2007/0260866 A1* | 11/2007 | Wang | G06F 21/57 713/2 |
| 2007/0288738 A1* | 12/2007 | Dale | G06F 21/575 713/2 |
| 2008/0028203 A1* | 1/2008 | Sakai | H04L 63/164 713/150 |
| 2008/0222443 A1* | 9/2008 | Wallner | H03M 9/00 713/502 |
| 2008/0301424 A1* | 12/2008 | Barajas | G06F 9/4401 713/2 |
| 2009/0265575 A1* | 10/2009 | Chen | G06F 11/2289 713/600 |
| 2009/0293132 A1* | 11/2009 | Henry | G06F 12/1408 726/27 |
| 2009/0319782 A1* | 12/2009 | Lee | G06F 21/575 713/156 |
| 2009/0327678 A1* | 12/2009 | Dutton | G06F 21/575 713/2 |
| 2010/0122076 A1* | 5/2010 | Witty | G06F 21/645 713/2 |
| 2010/0174919 A1* | 7/2010 | Ito | G06F 21/554 713/192 |
| 2010/0325628 A1* | 12/2010 | Haga | G06F 21/575 718/1 |
| 2011/0138164 A1* | 6/2011 | Cha | H04N 21/4432 713/2 |
| 2012/0054481 A1* | 3/2012 | Walker | G06F 9/4401 713/2 |
| 2012/0079593 A1* | 3/2012 | Adams | G06F 21/554 726/23 |
| 2012/0151223 A1* | 6/2012 | Conde Marques | G06F 21/6218 713/193 |
| 2012/0185683 A1* | 7/2012 | Krstic | G06F 21/575 713/2 |
| 2013/0039491 A1* | 2/2013 | Unagami | G06F 21/64 380/44 |
| 2013/0159690 A1* | 6/2013 | Tsukamoto | G06F 9/4401 713/2 |
| 2014/0115314 A1* | 4/2014 | Huang | G06F 21/575 713/2 |
| 2014/0164725 A1* | 6/2014 | Jang | G06F 21/84 711/163 |
| 2015/0026446 A1* | 1/2015 | Kim | G06F 1/04 713/1 |
| 2015/0377966 A1* | 12/2015 | Lee | G06F 9/4401 702/119 |
| 2016/0055332 A1* | 2/2016 | Jeansonne | G06F 21/575 726/22 |
| 2016/0063255 A1* | 3/2016 | Jeansonne | G06F 21/572 713/2 |
| 2016/0292422 A1* | 10/2016 | Hayashi | G06F 21/57 |
| 2016/0300074 A1* | 10/2016 | Huang | G06F 21/6245 |
| 2016/0357963 A1* | 12/2016 | Sherman | G06F 21/566 |
| 2016/0359636 A1* | 12/2016 | Kreft | G06F 21/71 |
| 2017/0063387 A1* | 3/2017 | Gao | H03B 5/1228 |
| 2017/0318039 A1* | 11/2017 | Kareti | G06F 1/28 |
| 2017/0364683 A1* | 12/2017 | Willden | G06F 21/53 |
| 2018/0004954 A1* | 1/2018 | Liguori | G06F 21/575 |
| 2018/0101677 A1* | 4/2018 | Broumas | G06F 21/44 |
| 2018/0285568 A1* | 10/2018 | Finger | G06F 9/4406 |
| 2018/0314811 A1* | 11/2018 | Hung | G06F 21/575 |
| 2018/0349604 A1* | 12/2018 | Khatri | H04L 9/3239 |
| 2018/0365424 A1* | 12/2018 | Callaghan | G06F 21/575 |
| 2019/0108344 A1* | 4/2019 | Roden, III | G06F 30/367 |
| 2019/0391817 A1* | 12/2019 | Seiler | H04L 9/3234 |
| 2019/0392149 A1* | 12/2019 | Yamashita | G06F 21/57 |

* cited by examiner

INFORMATION PROCESSING APPARATUS, CONTROL METHOD THEREOF, AND PROGRAM STORAGE MEDIUM

BACKGROUND OF THE INVENTION

Field of the Invention

The present invention relates to an information processing apparatus, a control method thereof, and a program storage medium.

Description of the Related Art

An information processing apparatus having a chipset that can detect the tampering of a system has been proposed. As an example of the chipset that can detect the tampering of the system, for example, there is a chipset that can verify the presence or absence of the tampering of a boot program in order to improve the security of the information processing apparatus. For example, a hard sequencer in the chipset verifies the presence or absence of the tampering of the boot program. Specifically, during starting-up, the hard sequencer reads out the boot program in a nonvolatile memory, calculates its hash value, and compares the calculated hash value with a hash value that serves as a master possessed by the hard sequencer. If there is a difference between the hash values as a result for comparing them, the hard sequencer prevents a firmware from being loaded into a volatile memory by not awaking the reset of the CPU, thereby controlling the system so as not to start-up.

The Specification of U.S. Pat. No. 9,734,339 discloses that a system that monitors a bus between the hard sequencer and the nonvolatile memory, reads out the boot program in the nonvolatile memory by using an embedded controller while the hard sequencer is not accessing the nonvolatile memory, and verify the presence or absence of the tampering.

The system disclosed in the specification of U.S. Pat. No. 9,734,339 can detect the tampering of the boot program by using the hard sequencer. However, in the system disclosed in the Specification of U.S. Pat. No. 9,734,339, a device other than the hard sequencer cannot detect that the start-up of the system has failed due to the tampering of the boot program if the system does not start-up normally.

SUMMARY OF THE INVENTION

The present invention to provide an information processing apparatus in which a device other than a device that verifies the tampering of the boot program can detect that the start-up of a system has failed due to the tampering of a boot program.

An information processing operation comprises: a memory configured to store a boot program for a system of an information processing apparatus in advance; a verification circuit configured to verify the presence or absence of the tampering of the boot program stored in the memory; a monitoring circuit configured to monitor a signal communicated between the verification circuit and the memory and to detect that the start-up of the system has failed due to the tampering of the boot program based on the monitoring result of the signal; and a notification circuit configured to provide notification of information related to the cause of failure of the start-up of the system, which is detected by the monitoring circuit.

According to the information processing apparatus of one embodiment of the present invention, a device other than the device that verifies the tampering of the boot program can detect that the start-up of the system has failed due to the tampering of the boot program.

Further features of the present description will be apparent from the following description of the example (with reference to the attached drawings).

DESCRIPTION OF THE EMBODIMENTS

Embodiment 1

Figure 1:
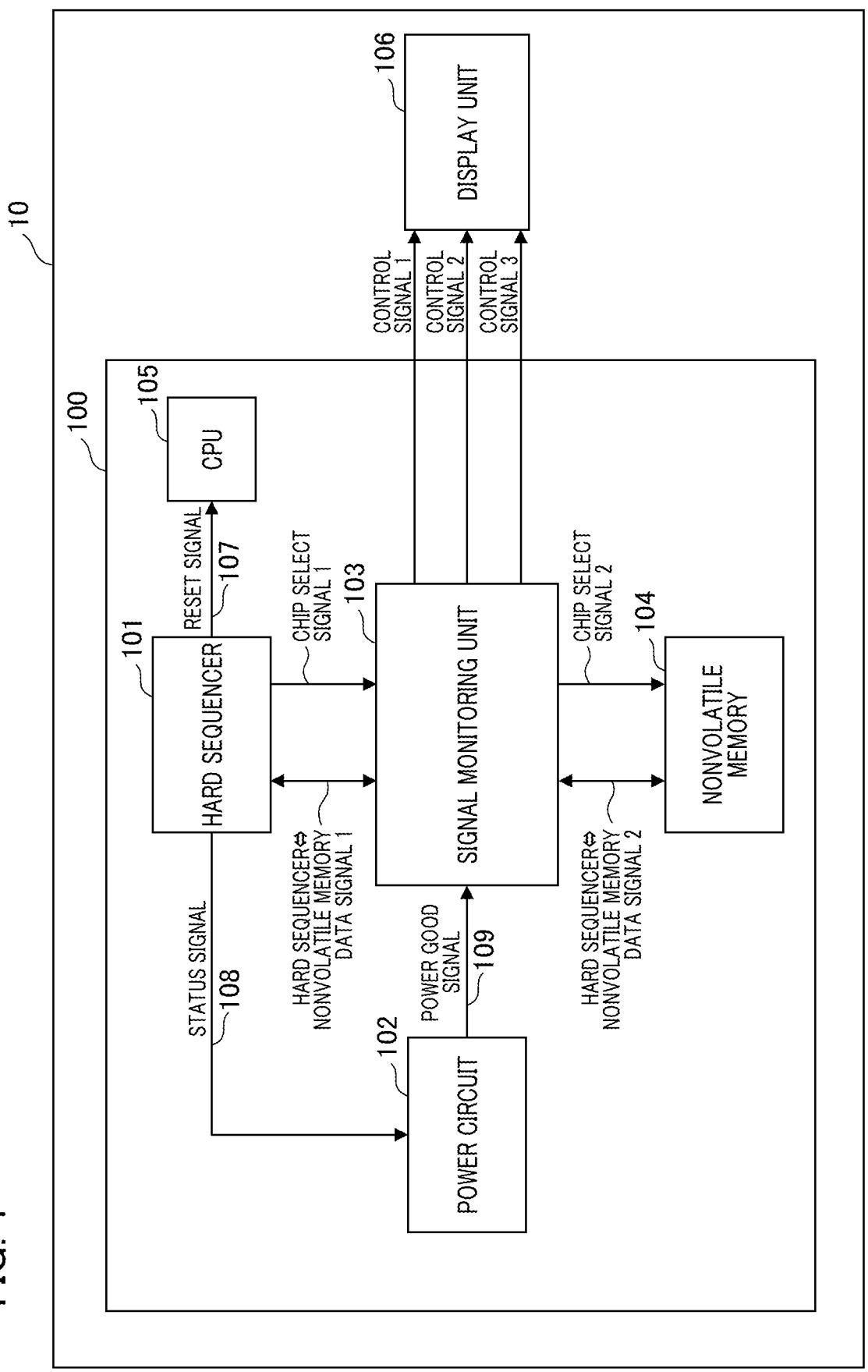
FIG. 1 illustrates a hardware configuration of an information processing apparatus.

FIG. 1 illustrates a hardware configuration of an information processing apparatus according to the present embodiment. An information processing apparatus 10 includes a controller 100 and a display unit 106. The controller 100 includes a hard sequencer 101, a power circuit 102, a signal monitoring unit 103, a nonvolatile memory 104, and a CPU 105. The hard sequencer 101 and the CPU 105 may be configured by one chip like a common chipset.

The CPU 105 controls the entire system of the information processing apparatus 10. The hard sequencer 101 plays a role of controlling the power source of the information processing apparatus 10 and reading out a firmware such as a boot program in the nonvolatile memory 104 after the power source is supplied to the hard sequencer 101. Additionally, the hard sequencer 101 also has a function for verifying the presence or absence of the tampering of the boot program. In the present specification, 'boot program' means a program for starting-up a computer or computer appliance until it can be used.

During starting-up of the system, the hard sequencer 101 performs verification of the tampering in a stepwise fashion, for example, the tampering with the firmware in the non-volatile memory 104, the tampering with a boot loader, an OS and application software stored in a HDD and/or an eMMC (not illustrated). As will be described below, the hard sequencer 101 may check a part of these programs, and the CPU which has been awaked from the reset signal may continue to check the other programs. That is, a verification unit that verifies the tampering of the program may include the CPU. HDD is an abbreviation for "Hard Disk Drive". eMMC is an abbreviation for "Multi Media Card". Additionally, OS is an abbreviation for "Operating System". If there is no problem in the firmware as a result for verifying the tampering, the hard sequencer awakes a reset signal 107 being output to the CPU 105. Consequently, the CPU 105 is controlled based on the OS and the application to control the entire system.

The power circuit 102 supplies power to the hard sequencer 101 based on a plurality of status signals 108 output from the hard sequencer 101. If the power circuit 102 completes supplying all the power required for the hard sequencer 101 to start-up the system, the power circuit 102 outputs a Power Good signal 109 to the signal monitoring unit 103.

The nonvolatile memory 104 is a storage unit that can hold the written data even if the power is not supplied. In a specific region of the nonvolatile memory 104, a boot program for the system of the information processing apparatus 10 such as Boot Code and firmware is stored in advance, and each region is independent. The signal monitoring unit 103 monitors a signal communicated between the hard sequencer 101 and the nonvolatile memory 104 (between the storage units), and detects a cause of failure of the start-up of the system of the information processing apparatus 10 based on a monitoring result of the signals.

In the present embodiment, an SPI is used as an interface between the hard sequencer 101 and the nonvolatile memory 104. The SPI is an abbreviation for "Serial Peripheral Interface". In the present embodiment, the signal monitoring unit 103 exists between the interface of the hard sequencer 101 and the interface of the nonvolatile memory 104. The signal monitoring unit 103 includes a hardware circuit different from the CPU. The signal monitoring unit 103 may be configured by, for example, a Complex Programmable Logic Device (CPLD) or a field-programmable gate array (FPGA). Details of the signal monitoring unit 103 will be described with reference to FIG. 6. The signal monitoring unit 103 inputs a Chip Select signals 1, and outputs the signals as a Chip Select signal 2 as it is. Additionally, in connection with data signals transferred between the hard sequencer 101 and the nonvolatile memory 104, the signal monitoring unit 103 inputs data signals 1 or 2 and outputs the data signals as data signals 2 or 1 as it is. Thereby, the signal monitoring unit 103 controls the delay times due to the internal circuit to meet the specification of SPI.

In the SPI, there are a Chip Select signal that is a selection signal for a master (a unit to start communication) to select a slave (a communication target) and a data signal that is transmitted and received between the master and the slave while the Chip Select signal is being asserted. In the present embodiment, while the master is the hard sequencer 101, the slave is the nonvolatile memory 104. Data lines to transmit signals from the hard sequencer 101 to the nonvolatile memory 104 and data lines to transmit signals from the nonvolatile memory 104 to the hard sequencer 101 exist independently.

The signals transmitted from the hard sequencer 101 to the nonvolatile memory 104 are used by the hard sequencer 101 for specifying the physical address of the non-volatile memory 104 corresponding to memory area in which data to be read and written are stored and for specifying methods for reading and writing the data. Additionally, the signals transmitted from the nonvolatile memory 104 to the hard sequencer 101 are used for, for example, transmitting the data stored at the address specified by the hard sequencer 101 and transmitting data indicating the end of a transaction. The Chip Select signal is a Low Active signal.

In the first embodiment, the signal monitoring unit 103 detects and counts an edge of the Chip Select signal and an edge of a data signal communicated between the hard sequencer 101 and the nonvolatile memory 104. Subsequently, the signal monitoring unit 103 detects a cause of failure of the start-up of the system based on the number of counted edges when a predetermined time has passed. For example, the signal monitoring unit 103 detects that the start-up of the system has failed due to the tampering of the boot program. For example, if detection of tampering is performed in a manner in which the BIOS program is stored in the nonvolatile memory 104 and performs the detection of the tempering, it can be specified that the cause of failure of the start-up of the system is that the tampering is detected by the BIOS program. Then, in order to indicate the result of specification, a notification may be provided by using a predetermined pattern of luminance or blinking of the LED. The signal monitoring unit 103 notifies the display unit 106 of a control signal corresponding to the detection result. The display unit 106 provides a notification in accordance with the control signal notified from the signal monitoring unit 103. The display unit 106 has a User Interface such as an LCD and a button, and an LED and a speaker for informing an error situation to a user. LCD is an abbreviation for "Liquid Crystal Display". LED is an abbreviation for "Light Emitting Diode". The display unit 106, for example, flashes the LED in response to the control signal. The method for flashing LED and timing for flashing LED can be programmed in the signal monitoring unit by using the hardware logic.

FIG. 2 to FIG. 5 illustrate an example of various signal waveform patterns monitored by the signal monitoring unit 103.

Figure 2:
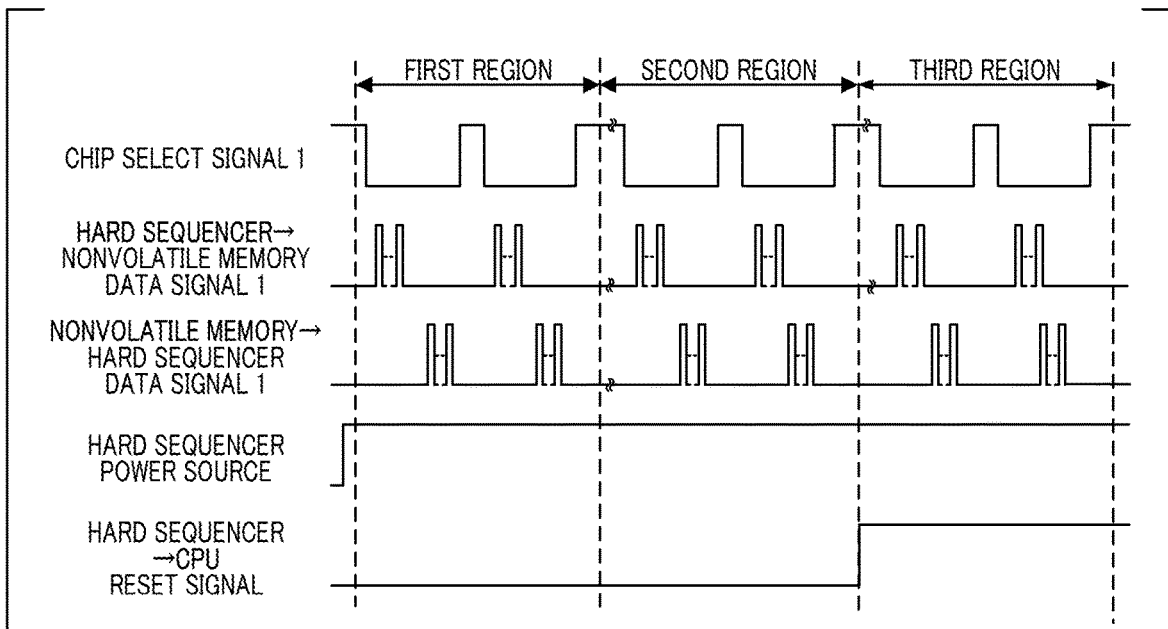
FIG. 2 illustrates a signal waveform during normal starting-up.

FIG. 2 illustrates various signal waveforms during normal starting-up. In a first region indicating a period of time after the power is supplied to the hard sequencer 101, the hard sequencer 101 asserts the Chip Select signal that selects the nonvolatile memory 104.

While the Chip Select signal is being asserted, the hard sequencer 101 requests reading out the boot program stored in a specific region of the nonvolatile memory 104. Subsequently, the nonvolatile memory 104 transmits the boot program data to the hard sequencer 101. However, the number of times the Chip Select signal is asserted depends on amounts of data read out from the nonvolatile memory 104. Thereafter, the hard sequencer 101 calculates a hash value of the boot program that has been read, and compares the calculated hash value with a hash value held in advance. Specifically, the first region corresponds to the period of time for verifying the tampering of the boot program. The waveform of the first region indicates that the hard sequencer 101 is verifying the tampering of the boot program.

A second region indicates a period of time during which the hard sequencer 101 reads out various strap information and the like stored in the nonvolatile memory. In the second region, a transaction appears before the reset signal 107 output from the hard sequencer 101 rises. Additionally, there is a sufficient space between the first region and the second region. If the hard sequencer 101 detects the tampering of the boot program and stops the start-up of the system, no transaction appears in the second region.

A third region indicates a period of time during which the hard sequencer 101 reads out the firmware stored in the nonvolatile memory and loads the firmware into a volatile memory (not illustrated) connected to the hard sequencer 101. In the third region, a transaction appears after the reset signal output from the hard sequencer 101 rises.

Figure 3:
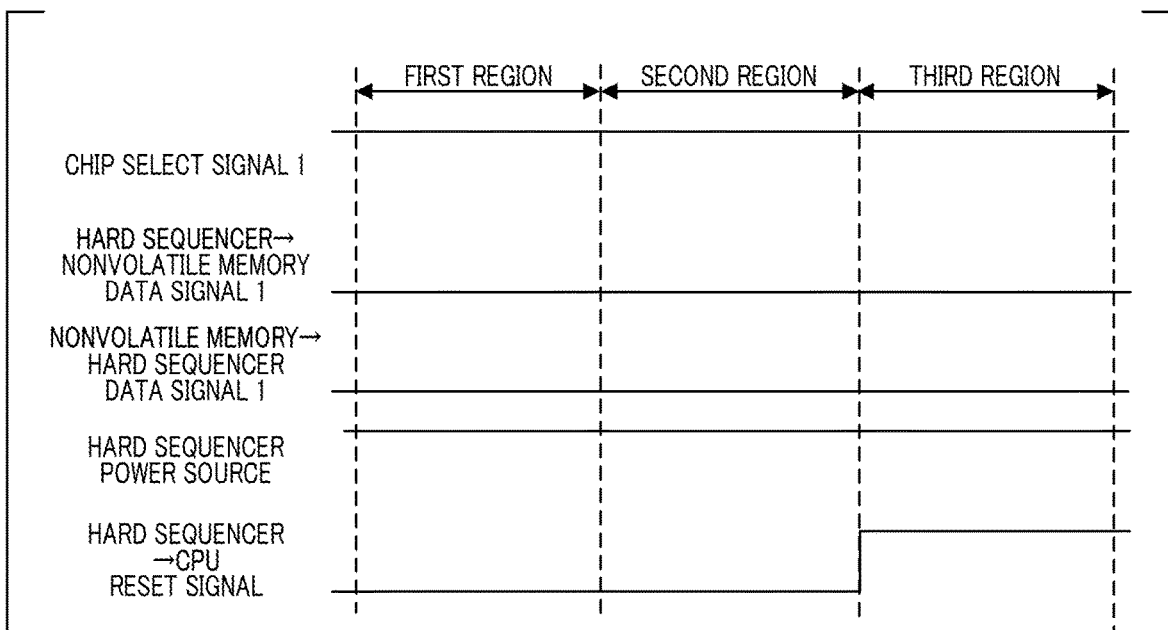
FIG. 3 illustrates a signal waveform during starting-up in a case a hard sequencer is in failure.

FIG. 3 illustrates various signal waveforms during starting-up in the case the hard sequencer is in failure. If the hard sequencer 101 is in failure, no transaction appears in the first region. There are three reason. The first one is that the status signal 108 to be output to the power circuit 102 is not output due to the failure of the hard sequencer 101, and so the power is not supplied to the CPU 105. The second one is that the hard sequencer 101 does not output the Chip Select signal although the supply of the power source to the hard sequencer 101 has completed. The third one is that the data signal from the hard sequencer 101 to the nonvolatile memory 104 is not output although the supply of the power source to the hard sequencer 101 has completed and the hard sequencer 101 outputs the Chip Select signal. Specifically, if there is no transaction in the first region, it can be determined that the hard sequencer 101 is in failure.

Figure 4:
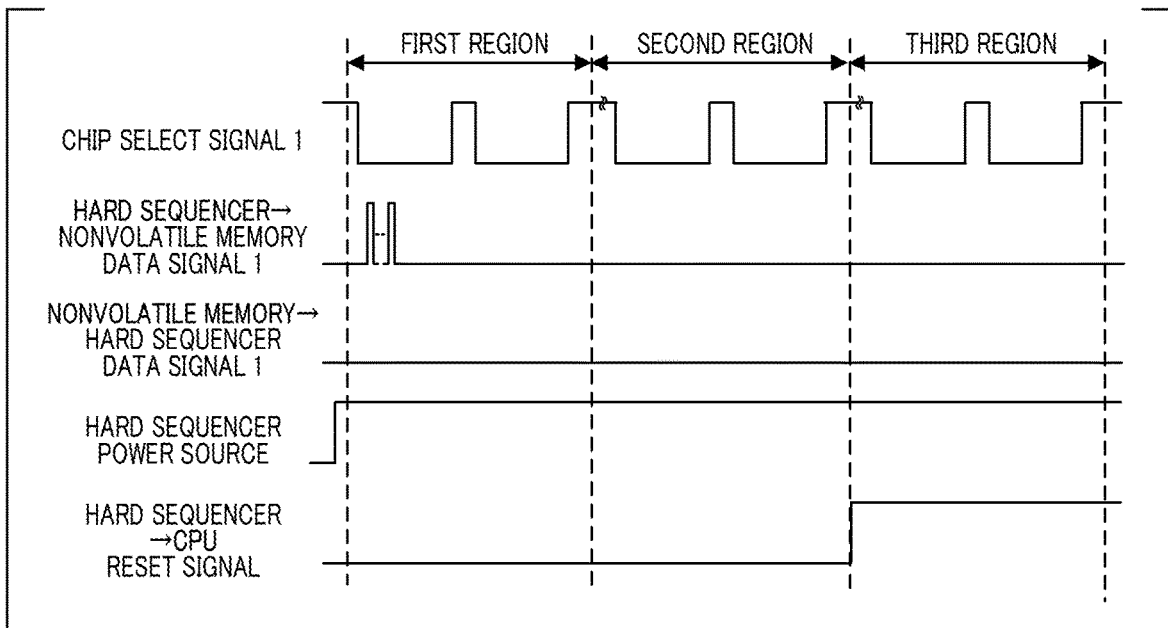
FIG. 4 illustrates a signal waveform during starting-up in a case a nonvolatile memory is in failure.

FIG. 4 illustrates various signal waveforms during starting-up in the case the nonvolatile memory is in failure. In the case the nonvolatile memory 104 is in failure, different from the case of FIG. 3, the hard sequencer 101 outputs the Chip Select signal in order to verify the tampering of the boot program after the power source is supplied. Although the hard sequencer 101 outputs the data signal to the nonvolatile memory 104, the nonvolatile memory 104 does not output the data. Accordingly, in the case, in the first region, the Chip Select signal and the data signal from the hard sequencer 101 to the nonvolatile memory 104 are sent but no data signal from the nonvolatile memory 104 to the hard sequencer 101 is sent, it can be determined that the nonvolatile memory 104 is in failure.

Figure 5:
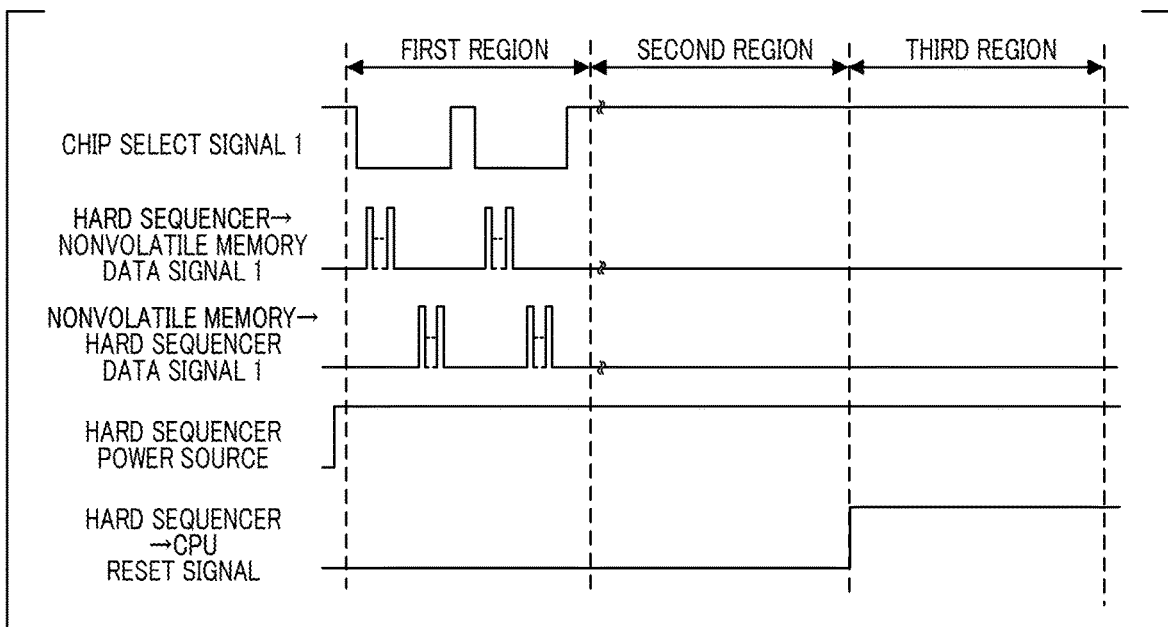
FIG. 5 illustrates a signal waveform if the tampering of a boot program is detected.

FIG. 5 illustrates various signal waveforms in the case the hard sequencer detects the tampering of the boot program and stops the starting-up of the system. The hard sequencer 101 transmits a data signal to the nonvolatile memory 104 to perform a reading-out request with designating a specific reuion in the nonvolatile memory 104. The nonvolatile memory 104 returns the boot program data stored at the specified address to the hard sequencer 101. The exchange of data signals between the hard sequencer 101 and the nonvolatile memory 104 is performed several times. Subsequently, the hard sequencer 101 calculates a hash value of the boot program data that has been read out, and compares the calculated hash value with the hash value being held.

If the tampering is detected due to a difference between the calculated hash value and the hash value being held and, the hard sequencer 101 stops the output of the chip select signal. Accordingly, the hard sequencer 101 performs control so as not to read out a strap originally performed in the second region or load the firmware originally performed in the third region. Specifically, if the Chip Select signal, the data signal from the hard sequencer 101 to the nonvolatile memory 104, and the data signal from the nonvolatile memory 104 to the hard sequencer 101 are confirmed only in the first region, it can be determined that the start-up of the system has failed due to the tampering of the boot program.

Figure 6:
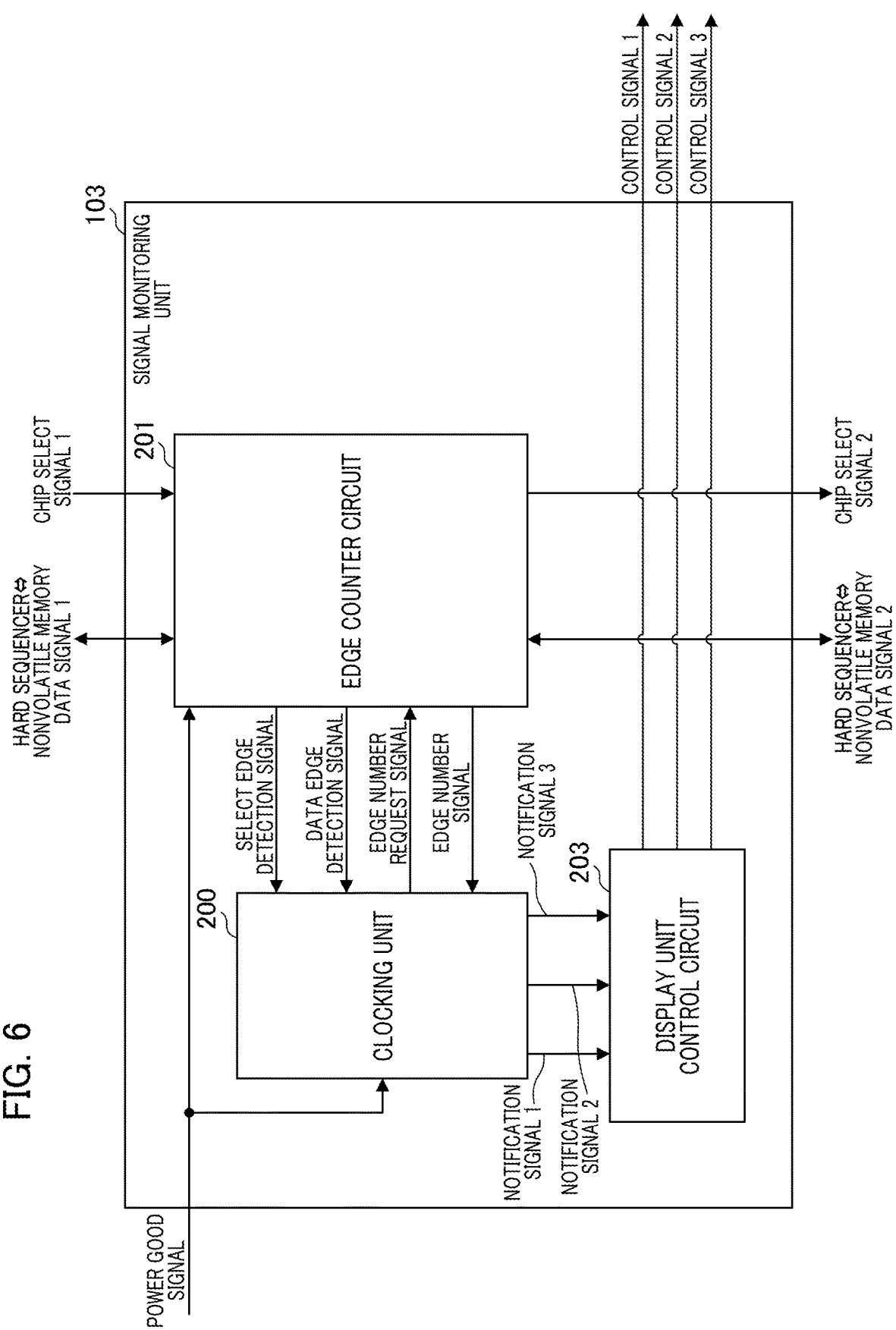
FIG. 6 illustrates a configuration example of a signal monitoring unit.

FIG. 6 illustrates a configuration example of a signal monitoring unit.

The signal monitoring unit 103 includes three internal function blocks of a clocking unit 200, an edge counter circuit 201, and a display unit control circuit 203. The edge counter circuit 201 starts counting the number of edges of the signal input from the hard sequencer 101 by receiving the Power Good signal 109 from the power circuit 102. In the present embodiment, the edge counter circuit 201 counts falling edges of the Chip Select signal. Additionally, the edge counter circuit 201 counts rising edges of data signals transferred between the hard sequencer 101 and the nonvolatile memory 104. Individual counters are respectively prepared for the Chip Select signal and the data signal. If an edge number request signal from the clocking unit 200 is asserted, the edge counter circuit 201 stops counting and transmits the current count value to the clocking unit 200. The edge number request signal is a signal requesting the number of counted edges. The edge counter circuit 201 inputs the signal from the hard sequencer 101 and outputs to the nonvolatile memory 104 as it is. However, a voltage level between the hard sequencer 101 and the nonvolatile memory 104 may be adjusted by providing a level shifter function unit (not illustrated) in the signal monitoring unit 103.

The clocking unit 200 detects the reason of failure caused at the starting-up of the system and outputs a notification signal indicating the reason. The clocking unit 200 starts timing in response to the reception of the Power Good signal 109 from the power circuit 102, and waits for the reception of the signal from the edge counter circuit 201. If a signal (select edge detection Signal) indicating that a Chip Select edge has been detected is not received from the edge counter circuit 201 even after the predetermined time has passed, the clocking unit 200 asserts a notification signal 1 to the display unit control circuit 203. The notification signal 1 indicates failure of the hard sequencer. The predetermined time described above is set for the period of time for the first region described above.

Additionally, if the clocking unit 200 does not receive a signal (data edge detection signal) notifying that the data signal between the hard sequencer 101 and the nonvolatile memory 104 has been detected from the edge counter circuit 201 even after the predetermined time has passed, the following processing is executed. That is, the clocking unit 200 asserts a notification signal 2 to the display unit control circuit 203. The notification signal 2 indicates the failure of the nonvolatile memory 104. Then, the clocking unit 200 asserts the edge number request signal to the edge counter circuit 201 after the predetermined time has passed.

If detecting the assertion of the edge number request signal, the edge counter circuit 201 executes the process below. That is, the edge counter circuit 201 transmits an edge number signal indicating the number of edges of the Chip Select signal and the data signal between the hard sequencer 101 and the nonvolatile memory 104 to the clocking unit 200.

The clocking unit 200 determines whether or not the number of edges indicated by the edge number signal received from the edge counter circuit 201 exceeds a predetermined value. The predetermined value is set to the number of edges counted during normal starting-up. However, since there is a possibility in which the number of transactions increase due to the process that requests retransmitting the boot program data due to the influence such as noises, the predetermined value may be set to any value larger than the number of edges counted during normal starting-up.

If the number of edges does not exceed the predetermined value, the clocking unit 200 determines whether or not the number of edges of the Chip Select signal exceeds the threshold value 1. If the number of edges of the Chip Select signal does not exceed the threshold value 1, the clocking unit 200 decides to detected that the hard sequencer 101 has failed during communication, and asserts the notification signal 1 to the display unit control circuit 203. The threshold value 1 is set to a value less than the number of edges counted in the first region during normal state.

If the number of edges of the Chip Select signal exceeds the threshold value 1, the clocking unit 200 determines whether or not the number of edges of the data signal from the nonvolatile memory 104 to the hard sequencer 101 exceeds the threshold value 2. If the number of edges of the data signal from the nonvolatile memory 104 to the hard sequencer 101 does not exceed the threshold value 2, the clocking unit 200 decides to detect that the nonvolatile memory 104 has failed during communication, and asserts the notification signal 2 to the display unit control circuit 203. The threshold value 2 is set to a value less than the number of edges counted in the first region during the normal state. If the number of edges of the data signal from the nonvolatile memory 104 to the hard sequencer 101 exceeds the threshold value 2, the clocking unit 200 decides to detect that the starting-up of the system has failed due to the tampering of the boot program and asserts a notification signal 3 to the display unit control circuit 203.

The display unit control circuit 203 changes the control signal to be outputted in accordance with the notification signal received from the clocking unit 200. If receiving the notification signal 1, the display unit control circuit 203 outputs a control signal 1. If receiving the notification signal 2, the display unit control circuit 203 outputs a control signal 2. If receiving the notification signal 3, the display unit control circuit 203 outputs a control signal 3. The display unit control circuit 203 controls the control signals 1 to 3 so as to operate at different frequencies. As an example, if receiving the notification signal 1, the display unit control circuit 203 operates the control signal 1 at a certain frequency and blinks the LED of the display unit 106. Additionally, if receiving the notification signal 2, the display unit control circuit 203 operates the control signal 2 at a frequency higher than the control signal 1.

Additionally, the signal monitoring unit 103 has a plurality of frequency dividers (not illustrated), and the frequency division ratios thereof are different from each other. As a result, there are different blinking patterns of the LED that blinks in response to each control signal, so that the user is allowed to know the cause of failure of the start-up of the system by using the blinking patterns.

Figure 7:
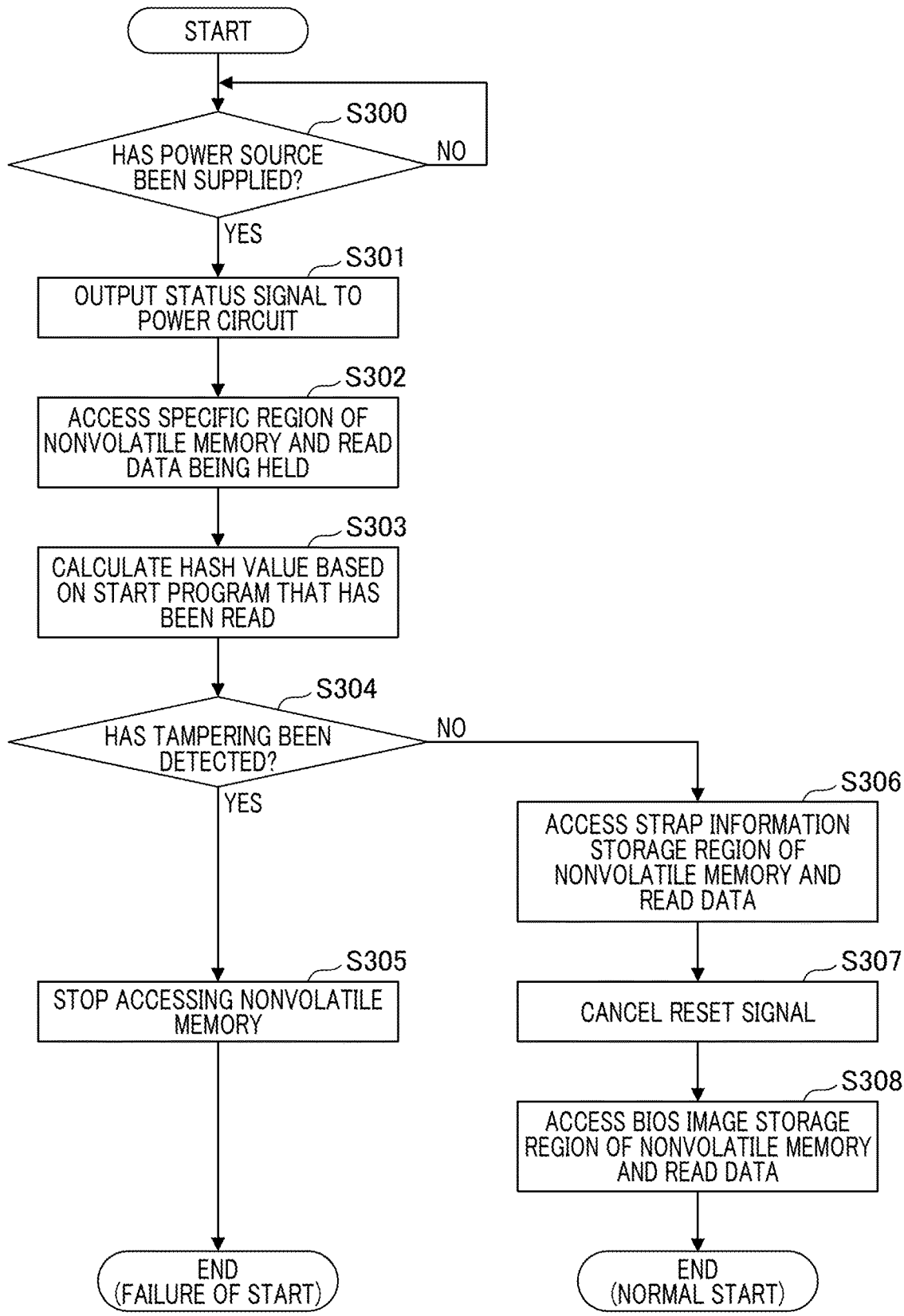
FIG. 7 is a flowchart that illustrates an operation process of the hard sequencer.
Figure 8:
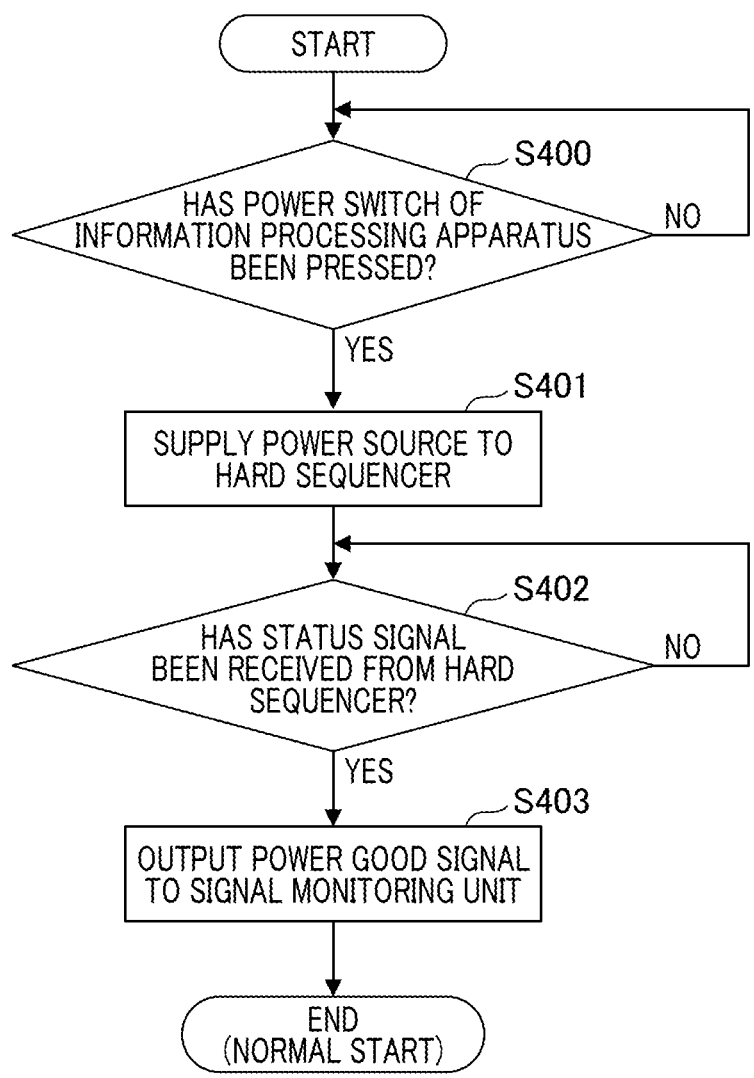
FIG. 8 is a flowchart that illustrates an operation process of a power circuit.
Figure 9:
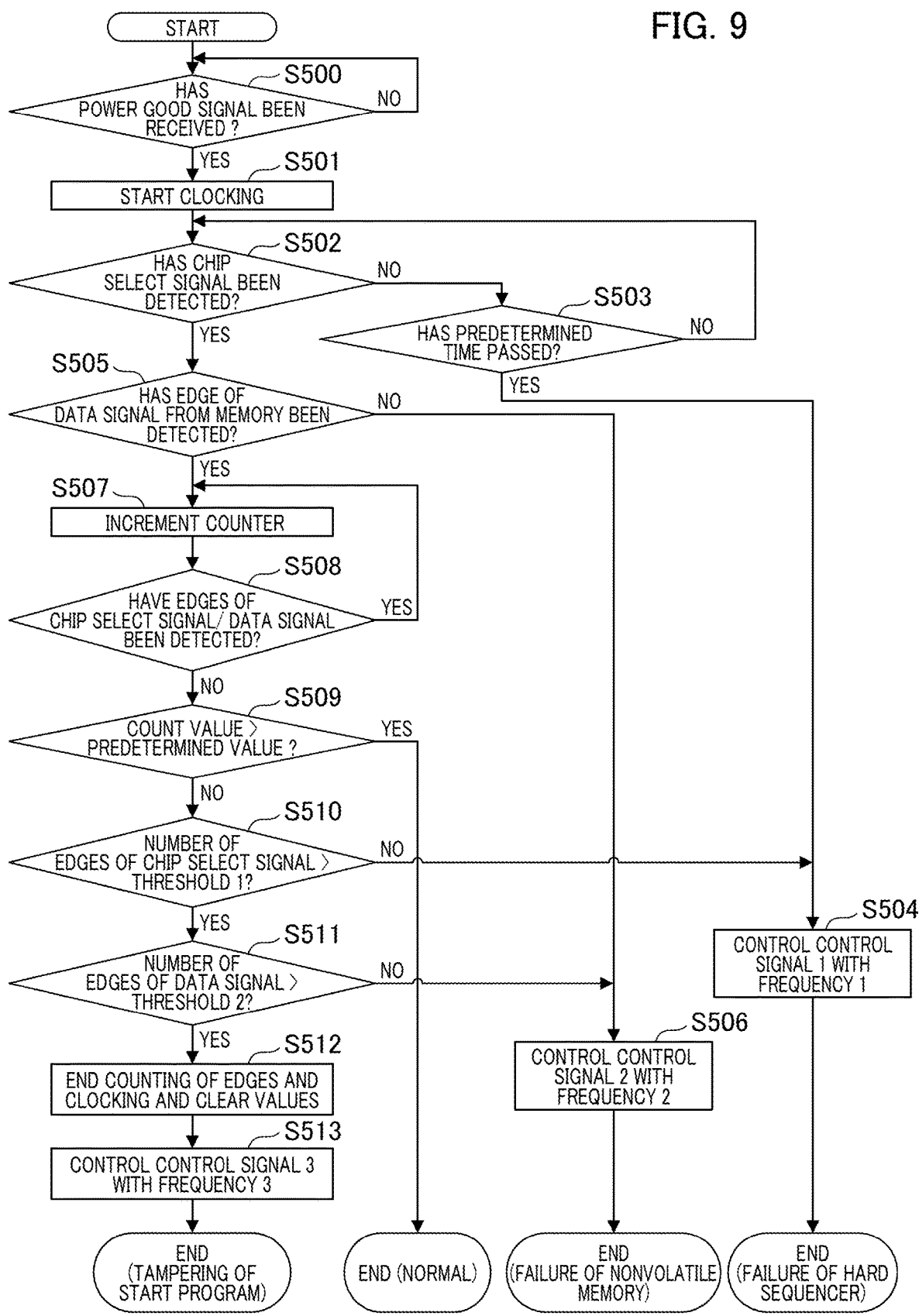
FIG. 9 is a flowchart that illustrates an operation process of the signal monitoring unit.

FIGS. 7 to 9 illustrate an operation process of hardware configuration components included in the information processing apparatus according to the first embodiment. FIG. 7 is a flowchart that illustrates an operation process of the hard sequencer 101. In step S300, the hard sequencer 101 determines whether or not the power source has been supplied to itself. If the power source has not been supplied, the process returns to step S300. If the power source has been supplied, the process proceeds to step S301. In step S301, the hard sequencer 101 outputs the status signal 108 to the power circuit 102. Subsequently, in step S302, the hard sequencer 101 asserts the Chip Select signal being output to the nonvolatile memory 104 to transition to a state in which communication starts, and specifies the physical address of the region where the boot program is stored and reads out the held boot program, by using a data signal line. In step S303, the hard sequencer 101 calculates a hash value using the boot program that has been read out.

In step S304, the hard sequencer 101 compares the calculated hash value with the hash value of the boot program held by the hard sequencer 101 as a master, and based on the comparison result, the hard sequencer 101 determines whether or not the tampering of the boot program has been detected. The case in which the calculated hash value is different from the hash value of the master indicates that the tampering has been detected. Accordingly, in this case, the process proceeds to step S305. In step S305, the hard sequencer 101 stops accessing the nonvolatile memory 104. Hence, the hard sequencer 101 does not read out the strap information or does not load the firmware, and as a result, the starting-up of the system stops.

If the calculated hash value and the master hash value are the same, the tampering is determined not to be detected. Accordingly, in this case, the process proceeds to step S306. In step S306, the hard sequencer 101 accesses the strap information storage region of the nonvolatile memory 104 in the manner same as that during read-out of the boot program, and reads out the strap information. In step S307, the hard sequencer 101 releases the reset signal. Then, in step S308, the hard sequencer 101 accesses the BIOS image storage region of the nonvolatile memory 104, reads out the firmware data, and loads the data into the volatile memory.

The scope of application of the present invention is not limited to the examples described above. A case is assumed in which the CPU is included in the verification unit that verifies the presence or absence of the tampering of the program. For example, in step S304, the hard sequencer 101 may only check the presence or absence of the tampering of only the BIOS in the nonvolatile memory 104, or check the presence or absence of the tampering of only the BIOS and the program loader. A detection process that detects whether or not these tampering targets are tampered may be performed in step S304. If the tampering has not been detected ("NO" in step S304), the hard sequencer 101 executes steps S306 and S307. Then, the CPU 105 in which the reset signal has been awaked in step S307 may read the OS and the application stored in a nonvolatile memory (not illustrated) that is different from the nonvolatile memory 104, and may continue to detect tampering.

Additionally, a hardware circuit (for example, CPLD), that is different from the CPU, included in the signal monitoring unit 103 may monitor the signal between the CPU and the nonvolatile memory connected to the CPU and may detect that the starting-up of the system has failed due to the tampering of the boot program. Then, the hardware circuit may notify an output device (for example, the display unit 106 in FIG. 1) connected to the hardware circuit of information about the cause of failure of the start-up of the detected system.

FIG. 8 is a flowchart that illustrates an operation process of the power circuit. In step S400, the power circuit 102 determines whether or not a power switch (not illustrated) of the information processing apparatus 10 has been pressed. As an example of methods for detecting the pressing of the power switch, there is a method that utilizes voltage change caused by pressing the power switch. If the power switch has not been pressed, the process returns to step S400. If the power switch has been pressed, the process proceeds to step S401. In step S401, the power circuit 102 supplies a power source to the hard sequencer 101. Subsequently, in step S402, it is determined whether or not the power circuit 102 has received the status signal 108 from the hard sequencer 101. If the power circuit 102 has not received the status signal 108 from the hard sequencer 101, the process returns to step S402. If the power circuit 102 has received the status signal 108 from the hard sequencer 101, the process proceeds to step S403. Then, in step S403, the power circuit 102 outputs the Power Good signal 109 to the signal monitoring unit 103.

FIG. 9 is a flowchart that illustrates an operation process of the signal monitoring unit. First, the power source is supplied to the signal monitoring unit 103. In step S500, the signal monitoring unit 103 determines whether or not the Power Good signal 109 has been received from the power circuit 102. If the Power Good signal 109 has not been received from the power circuit 102, the process returns to step S500. If the Power Good signal 109 has been received from the power circuit 102, the process proceeds to step S501.

In step S501, the signal monitoring unit 103 starts clocking. Subsequently, in step S502, it is determined whether or not the signal monitoring unit 103 has detected a falling edge of the Chip Select signal input from the hard sequencer 101. If the signal monitoring unit 103 has not detected the falling edge of the Chip Select signal, the process proceeds to step S503. If the signal monitoring unit 103 detects the falling edge of the Chip Select signal, the process proceeds to step S505.

In step S503, the signal monitoring unit 103 determines whether or not the predetermined time has passed (elapsed). In this example, the predetermined time is set to be longer than the time from when the power source of the signal monitoring unit 103 is supplied to when the Chip Select signal starts to be asserted and is set to be shorter than the time from when the power source of the signal monitoring unit 103 is supplied to when the first region ends. Specifically, the predetermined time used for the determination process in step S503 is determined in accordance with the period of time for verifying the presence or absence of the tampering of the boot program. If the predetermined time has passed, the process proceeds to step S504. In step S504, the signal monitoring unit 103 controls the control signal 1 with a frequency 1. Thus, the user is notified that start-up of the system has failed due to the failure of the hard sequencer 101. If the predetermined time has not passed, the process returns to step S502.

In step S505, it is determined whether or not the signal monitoring unit 103 has detected a rising edge of the data signal communicated from the nonvolatile memory 104 to the hard sequencer 101 within a predetermined time. If the signal monitoring unit 103 has not detected the rising edge of the data signal communicated from the nonvolatile memory 104 to the hard sequencer 101 within the predetermined time, the process proceeds to step S506. In step S506, the signal monitoring unit 103 controls the control signal 2 with the frequency 2. Hence, the user is notified that the start-up of the system has failed due to the failure of the nonvolatile memory 104.

If the signal monitoring unit 103 has detected the rising edge of the data signal sent from the nonvolatile memory 104 to the hard sequencer 101 within the predetermined time, the process proceeds to step S507. In step S507, the signal monitoring unit 103 increments the count value of the number of edges in accordance with the detected edge of each signal. Subsequently, in step S508, it is determined whether or not the signal monitoring unit 103 has detected the falling edge of the Chip Select signal or the rising edge of the data signal communicated between the hard sequencer 101 and the nonvolatile memory 104 within a predetermined time. If the signal monitoring unit 103 has detected the edge within the predetermined time, the process returns to step S507 and the signal monitoring unit 103 increments the count value. If the signal monitoring unit 103 has not detected the edge within the predetermined time, in other words, if the communication between the hard sequencer 101 and the nonvolatile memory 104 has ended, the process proceeds to step S509.

In step S509, the signal monitoring unit 103 determines whether or not the number of edges indicated by the count value exceeds a predetermined value. The number of edges to be compared with the predetermined value is the sum of the number of falling edges of the Chip Select signal and the number of rising edges of the data signal transmitted and received between the hard sequencer 101 and the nonvolatile memory 104. The predetermined value used in the determination process in step S509 is a value within a range obtained by adding the number of edges that increases by a boot program data retransmitting requests process to the number of edges counted if originally the system starts-up normally. Needless to say, the definition of the predetermined value is not limited to the value above.

The case in which the number of edges exceeds the predetermined value indicates that even after verifying presence or absence of the tampering of the boot program, read-out of the strap information and the firmware has been performed between the hard sequencer 101 and the nonvolatile memory 104. Accordingly, the signal monitoring unit 103 determines to detect that the system has started-up normally. If the number of edges does not exceed the predetermined value, the process proceeds to step S510. In step S510, the signal monitoring unit 103 confirms whether or not the counted number of edges of the Chip Select signal exceeds the threshold value 1. Hence, it is possible to confirm whether or not the hard sequencer 101 has failed during communication. The case in which the number of edges does not exceed the threshold value 1 indicates that the hard sequencer 101 has failed during communication. Accordingly, in this case, the process proceeds to step S504 and the signal monitoring unit 103 controls the control signal 1 with the frequency 1. Thus, the failure of the hard sequencer 101 is notified. If the number of edges exceeds the threshold value 1, the process proceeds to step S511.

In step S511, the signal monitoring unit 103 determines whether or not the number of edges of the data signal communicated between the hard sequencer 101 and the nonvolatile memory 104 exceeds the threshold value 2. Accordingly, it is possible to confirm whether or not the nonvolatile memory 104 has failed during communication. The case in which the number of edges does not exceed the threshold value 2 indicates that the nonvolatile memory 104 has failed during communication. Hence, in this case, the process proceeds to step S506 and the signal monitoring unit 103 controls the control signal 2 with the frequency 2. Thus, the failure of the nonvolatile memory 104 is notified.

If the number of edges exceeds the threshold value 2, the process proceeds to step S512. In step S512, the signal monitoring unit 103 ends the counting of edges and clocking, and clears each of them. In step S513, the signal monitoring unit 103 controls the control signal 3 with frequency 3. Hence, the user is notified that the starting-up of the system has failed due to the tampering of the boot program.

Figure 10:
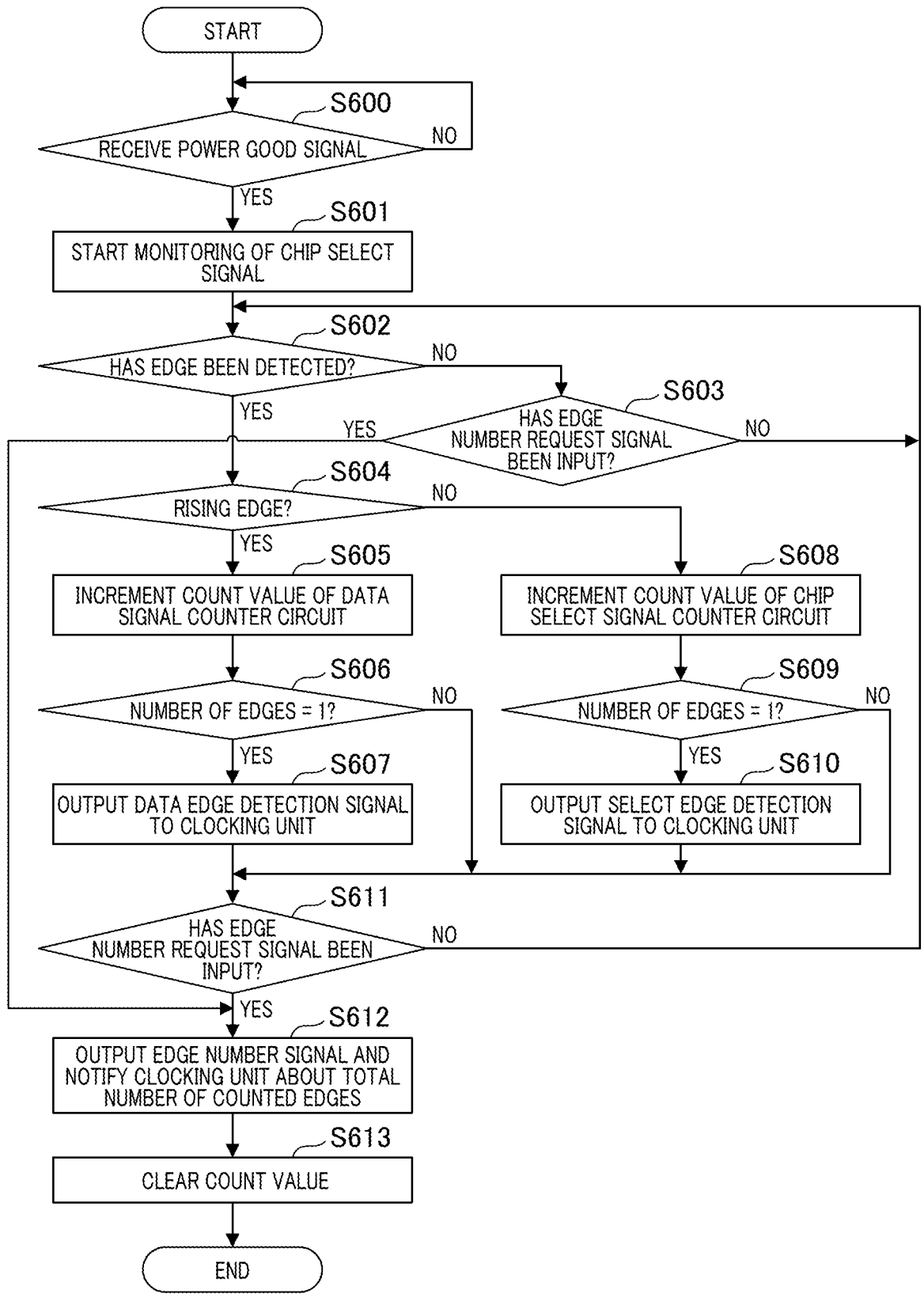
FIG. 10 is a flowchart that illustrates an operation process of an edge counter circuit.

Next, with reference to FIGS. 10 to 12, the process for the internal function block of the signal monitoring unit 103 will be described. FIG. 10 is a flowchart that illustrates the operation process of the edge counter circuit 201. In step S600, the edge counter circuit 201 determines whether or not the Power Good signal 109 has been input from the power circuit 102. If the Power Good signal 109 has not been input from the power circuit 102, the process returns to step S600. If the Power Good signal 109 has been input from the power circuit 102, the process proceeds to step S601. In step S601, the edge counter circuit 201 starts monitoring the edge of the Chip Select signal input from the hard sequencer 101 and the edge of the data signal communicated between the hard sequencer 101 and the nonvolatile memory 104. The edge counter circuit 201 monitors the falling edge of the Chip Select signal. The edge counter circuit 201 monitors the rising edge of the data signal communicated between the hard sequencer 101 and the nonvolatile memory 104.

Next, in step S602, the edge counter circuit 201 determines whether the edge of any one of the signals has been detected. If no edge has been detected, the process proceeds to step S603. If the edge has been detected, the process proceeds to step S604. In step S603, the edge counter circuit 201 determines whether or not the edge number request signal has been input (asserted) from the clocking unit 200. The edge number request signal is a signal output from the clocking unit 200 after a predetermined time has passed, indicating that the communication between the hard sequencer 101 and the nonvolatile memory 104 has ended. Accordingly, if the edge number request signal has been asserted, the process proceeds to step S612. In step S612, the edge counter circuit 201 outputs the edge number signal indicating the total number of counted edges to the clocking unit 200. Thereafter, in step S613, the edge counter circuit 201 clears the count value of the counter circuit corresponding to each of the Chip Select signal and the data signal communicated between the hard sequencer 101 and the nonvolatile memory 104 (step S613).

In step S604, the edge counter circuit 201 determines whether the detected edge is a rising edge. If the detected edge is a rising edge, the process proceeds to step S605. If the detected edge is a falling edge instead of a rising edge, the process proceeds to step S608.

In step S605, the edge counter circuit 201 increments the count value of the counter circuit that counts the edge of the data signal communicated between the hard sequencer 101 and the nonvolatile memory 104. Then, the process proceeds to step S606. Subsequently, in step S606, the edge counter circuit 201 determines whether or not the count value of the number of edges has become 1. If the count value of the number of edges has become 1, the process proceeds to step S607. If the count value of the number of edges has not become 1, the process proceeds to step S611. In step S607, the edge counter circuit 201 outputs a signal (data edge detection signal) indicating that the edge of the data signal communicated between the hard sequencer 101 and the nonvolatile memory 104 has been detected to the clocking unit 200. The clocking unit 200 can determine whether the falling edge of the Chip Select signal has been detected or the rising edge of the data signal communicated between the hard sequencer 101 and the nonvolatile memory 104 has been detected, based on the signal output from the edge counter circuit 201.

Additionally, in step S608, the edge counter circuit 201 increments the count value of the counter circuit that counts the edge of the Chip Select signal. Subsequently, in step S608, the edge counter circuit 201 determines whether or not the count value of the edge number has become 1. If the count value of the number of edges has become 1, the process proceeds to step S610. If the count value of the number of edges has not become 1, the process proceeds to step S611. In step S610, the edge counter circuit 201 outputs a signal (Select edge detection signal) indicating that the edge of the Chip Select signal has been detected to the clocking unit 200.

Next, in step S611, the edge counter circuit 201 determines whether or not the edge number request signal has been input from the clocking unit 200. If the edge number request signal has not been input from the clocking unit 200, the process returns to step S602. If the edge number request signal has been input from the clocking unit 200, the process proceeds to step S612.

Figure 11:
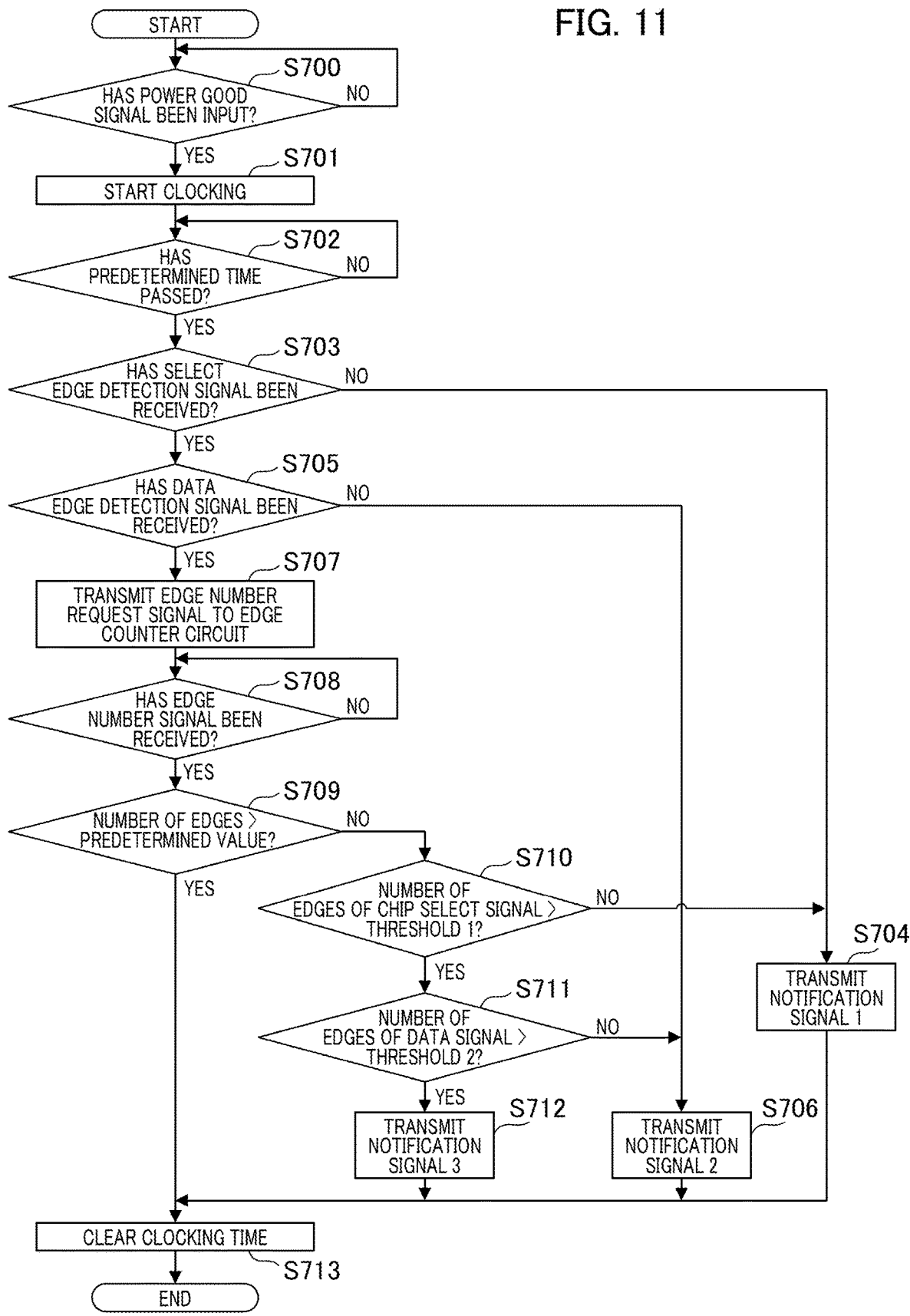
FIG. 11 is a flowchart that illustrates an operation process of a clocking unit.

FIG. 11 is a flowchart that illustrates the operation process of the clocking unit. In step S700, the clocking unit 200 determines whether or not the Power Good signal 109 has been input from the power circuit 102. If the Power Good signal 109 has not been input from the power circuit 102, the process returns to step S700. If the Power Good signal 109 has been input from the power circuit 102, the process proceeds to step S701. In step S701, the clocking unit 200 starts clocking. Subsequently, in step S702, the clocking unit 200 determines whether or not a predetermined time has passed. The predetermined time used in the determination process in step S702 is the same as that used in the determination process in step S503 in FIG. 9. If the predetermined time has not passed, the process returns to step S702. If the predetermined time has passed, the process proceeds to step S703.

Next, in step S703, it is determined whether or not the clocking unit 200 has received the Select edge detection signal from the edge counter circuit 201. If the clocking unit 200 has not received the Select edge detection signal from the edge counter circuit 201, the clocking unit 200 determines that the hardware sequencer 101 has failed and the process proceeds to step S704. Then, in step S704, the clocking unit 200 transmits the notification signal 1 to the display unit control circuit 203. If the clocking unit 200 has received the Select edge detection signal from the edge counter circuit 201, the process proceeds to step S705.

In step S705, it is determined whether or not the clocking unit 200 has received a data edge detection signal from the edge counter circuit 201. If the clocking unit 200 has not received the data edge detection signal from the edge counter circuit 201, the process proceeds to step S706. Subsequently, in step S706, the clocking unit 200 transmits the notification signal 2 to the display unit control circuit 203. If the clocking unit 200 has received the data edge detection signal from the edge counter circuit 201, the process proceeds to step S707.

In step S707, the clocking unit 200 transmits the edge number request signal to the edge counter circuit in order to obtain the total number of edges detected in the first region. Subsequently, it is determined whether or not the clocking unit 200 has received the edge number signal. If the clocking unit 200 has not received the edge number signal, the process returns to step S708. If the clocking unit 200 has received the edge number signal, the process proceeds to step S709.

In step S709, the clocking unit 200 determines whether or not the number of edges detected in the first region indicated by the edge number signal exceeds a predetermined value. As described above, the predetermined value is set to the number of edges counted if the system has started-up normally. If the number of edges exceeds the predetermined value, the process proceeds to step S713. Then, in step S713, the clocking unit 200 clears the clocking time.

If the number of edges is equal to or less than the predetermined value, the clocking unit 200 determines that the hard sequencer 101 and the nonvolatile memory 104 have communicated only in the first region, and the process proceeds to step S710. In step S710, the clocking unit 200 determines whether or not the number of edges of the Chip Select signal exceeds the threshold value 1. As described above, the threshold value 1 is set to a value less than the number of edges counted in the first region during normal starting-up of the system. If the number of edges of the Chip Select signal is equal to or less than the threshold 1, the clocking unit 200 determines that the hard sequencer 101 has failed during communication, and the process proceeds to step S704. Then, in step S704, the clocking unit 200 transmits the notification signal 1 to the display unit control circuit 203.

If the number of edges of the Chip Select signal exceeds the threshold 1, the process proceeds to step S711. In step S711, the clocking unit 200 determines whether or not the number of edges of the data signal communicated between the hard sequencer 101 and the nonvolatile memory 104 exceeds the threshold 2. As described above, the threshold value 2 is set to a value less than the number of edges counted in the first region during normal starting-up. If the number of edges of the data signal communicated between the hard sequencer 101 and the nonvolatile memory 104 is equal to or less than the threshold 2, the clocking unit 200 determines that the nonvolatile memory 104 has failed during communication and the process proceeds to step S706. Then, in step S706, the clocking unit 200 transmits the notification signal 2 to the display unit control circuit 203. If the number of edges of the data signal communicated between the hard sequencer 101 and the nonvolatile memory 104 exceeds the threshold 2, the clocking unit 200 determines that the starting-up of the system has failed due to the tampering of the boot program, and the process proceeds to step S712. Then, in step S712, the clocking unit 200 transmits the notification signal 3 to the display unit control circuit 203.

Figure 12:
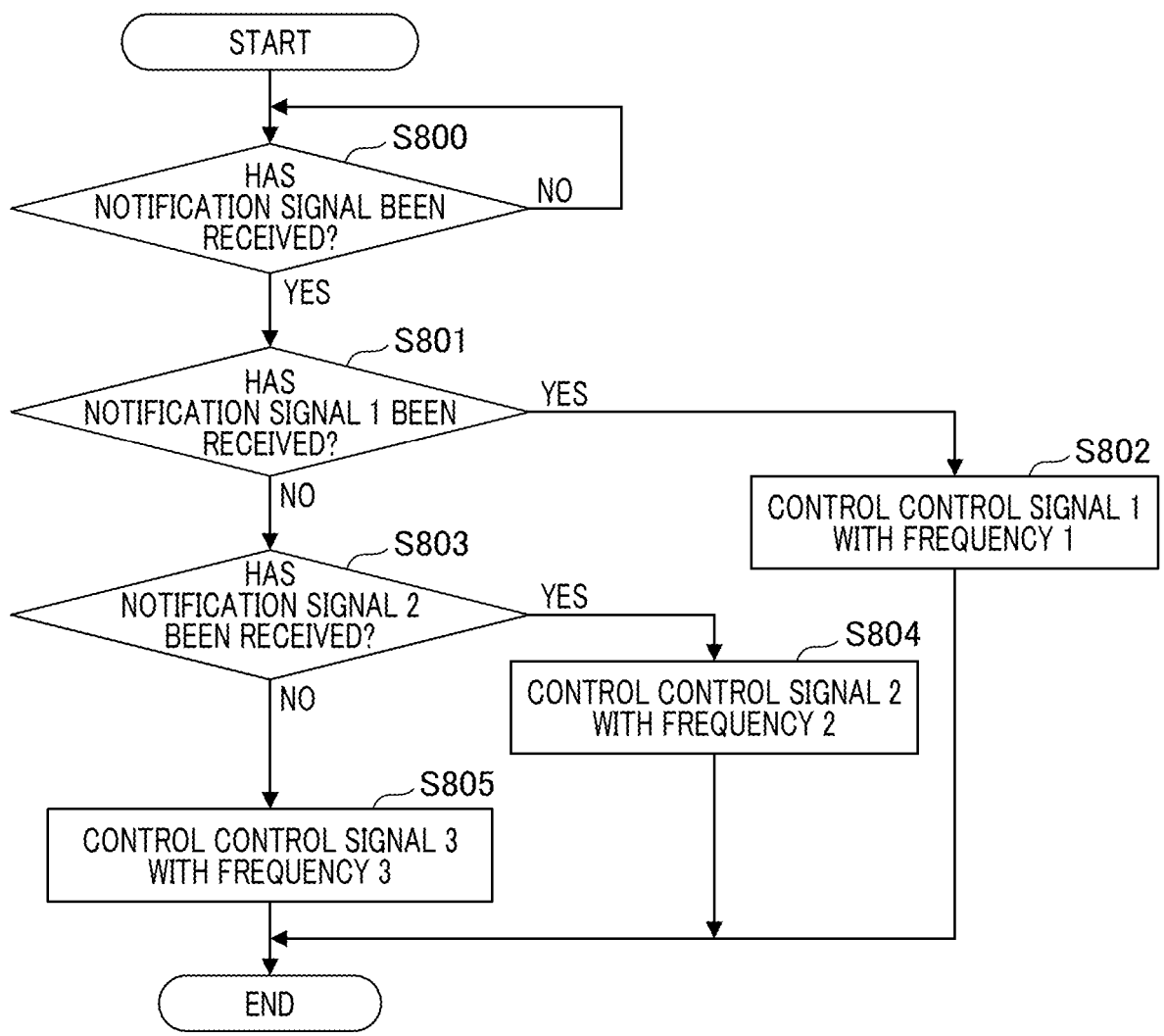
FIG. 12 is a flowchart that illustrates an operation process of a display unit control circuit.

FIG. 12 is a flowchart that illustrates the operation process of the display unit control circuit.

In step S800, it is determined whether or not the display unit control circuit 203 has received the notification signal from the clocking unit 200. If the display unit control circuit 203 has not received the notification signal from the clocking unit 200, the process returns to step S800. If the display unit control circuit 203 has received the notification signal from the clocking unit 200, the process proceeds to step S801. In step S801, it is determined whether or not the display unit control circuit 203 has received the notification signal 1. If the display unit control circuit 203 has received the notification signal 1, the process proceeds to step S802. Then, in step S802, the display unit control circuit 203 controls the control signal 1 with the frequency 1.

If the display unit control circuit 203 has not received the notification signal 1, the process proceeds to step S803. In step S803, it is determined whether or not the display unit control circuit 203 has received the notification signal 2 from the clocking unit 200. If the display unit control circuit 203 has received the notification signal 2, the process proceeds to step S804. Then, in step S804, the display unit control circuit 203 controls the control signal 2 with the frequency 2.

The case in which the display unit control circuit 203 has not received the notification signal 2 from the clocking unit 200 indicates that the display unit control circuit 203 has received the notification signal 3. Accordingly, in this case, the process proceeds to step S805. Then, in step S805, the display unit control circuit 203 controls the control signal 3 with the frequency 3. In the information processing apparatus according to the present embodiment, the CPU 101 is reset during verification of the boot program. Therefore, according to the information processing apparatus in the present embodiment, it is possible to detect that the starting-up of the system has failed due to the tampering of the boot program without intervention of software such as an OS or an application that works on the CPU 105.

Second Embodiment

An information processing apparatus according to the second embodiment will be described. The entire configuration of the information processing apparatus according to the second embodiment is the same as that of the information processing apparatus according to the first embodiment shown in FIG. 1. However, in the second embodiment, there is a difference in the internal functional blocks of the signal monitoring unit 103 as compared with the first embodiment, so the difference will be mainly described.

Figure 13:
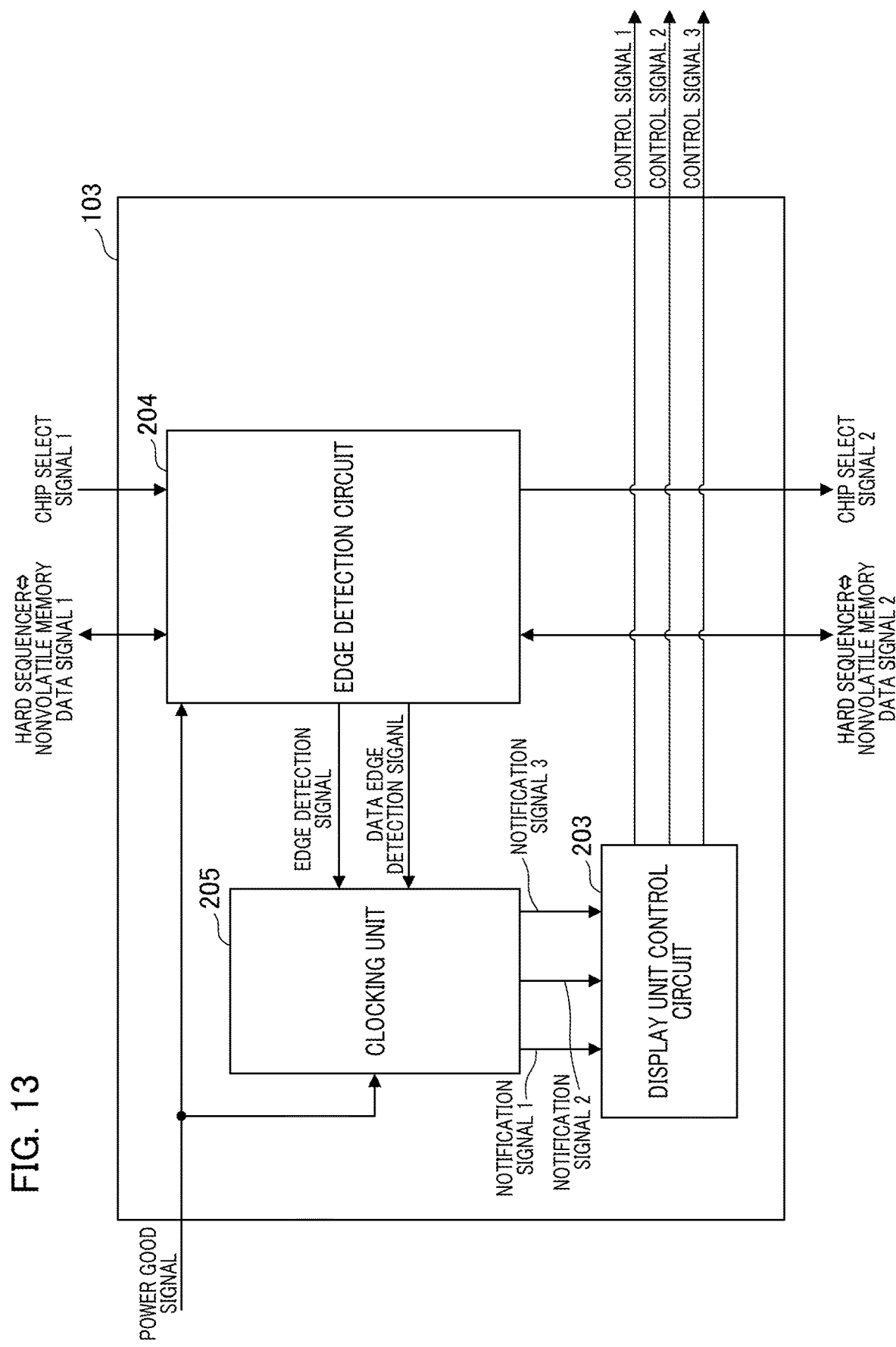
FIG. 13 illustrates a configuration of the signal monitoring unit.

FIG. 13 illustrates a configuration of a signal monitoring unit provided in the information processing apparatus according to the second embodiment. The signal monitoring unit 103 includes a clocking unit 205, an edge detection circuit 204, and the display unit control circuit 203. The display unit control circuit 203 is similar to the display unit control circuit 203 shown in FIG. 6. In the present embodiment, the signal monitoring unit 103 clocks the time between the Chip Select signal that has been output first and the Chip Select signal that has been output latest and separates the cause of failure of the start-up of the system. Specifically, if the clock time is contained in the first region, the signal monitoring unit 103 determines that the start-up of the system has failed due to the tampering of the boot program. If the clock time is longer than the time of the first region, the signal monitoring unit 103 determines that the system has started-up normally. Additionally, in order to separate the failure of the nonvolatile memory 104, the signal monitoring unit 103 also monitors the rising edge of the data signal communicated between the hard sequencer 101 and the nonvolatile memory 104 in a manner similar to the first embodiment.

The clocking unit 205 starts clocking in response to the input of the Power Good signal 109 output from the power circuit 102. If the clocking unit 205 has not received the selection edge detection signal from the edge detection circuit 204 after a predetermined time has passed, the clocking unit 205 transmits the notification signal 1 to the display unit control circuit 203. In a manner similar to the first embodiment, the predetermined time is longer than the time from when the power source is supplied to the hard sequencer 101 to when the Chip Select signal starts to be asserted and is set to be shorter than the time from when the power source of the signal monitoring unit 103 is supplied to when the first region ends. Additionally, each time the edge detection circuit 204 detects the falling edge of the Chip Select signal, the edge detection circuit 204 transmits the Select edge detection signal to the clocking unit 205.

If the clocking unit 205 has not received the data edge detection signal after a predetermined time has passed, the clocking unit 205 transmits the notification signal 2 to the display unit control circuit 203. If the clocking unit 205 has received the Select Edge Detection signal first, the clocking unit 205 holds the clock time at that time as the clock time 1. Next, if the clocking unit 205 has received the Select edge detection signal within a predetermined time, the clocking unit 205 holds the clock time at that time as the clock time 2, and subsequently, each time the clocking unit 205 receives the Select Edge detection signal within the predetermined time, the clocking unit 205 overwrites the clock time 2.

If the clocking unit 205 has not received the Select Edge Detection Signal within the predetermined time, the clocking unit 205 calculates the time in accordance with the difference between the clock time 2 and the clock time 1 held at that stage. If the calculated time does not exceed the time of the first region, the clocking unit 205 determines that the starting-up of the system has failed due to the tampering of the boot program and transmits the notification signal 3.

The edge detection circuit 204 executes the process below in response to receiving the Power Good signal 109 from the power circuit 102. The edge detection circuit 204 starts monitoring the falling edge of the Chip Select signal output from the hard sequencer 101 and the rising edge of the data signal communicated between the hard sequencer 101 and the nonvolatile memory 104.

If the edge detection circuit 204 has detected the falling edge of the Chip Select signal the edge detection circuit 204 transmits the Select edge detection signal to the clocking unit 205. Additionally, if the edge detection circuit 204 has detected the rising edge of the data signal communicated between the hard sequencer 101 and the nonvolatile memory 104, the edge detection circuit 204 transmits the data edge detection signal to the clocking unit 205. However, as described above, the edge detection circuit 204 transmits the Select Edge detection signal each time the falling edge of the Chip Select signal is detected. Additionally, the edge detection circuit 205 inputs the signals from the hard sequencer 101 and the nonvolatile memory 104 and outputs the signals directly to the hard sequencer 101 and the nonvolatile memory 104.

Figure 14:
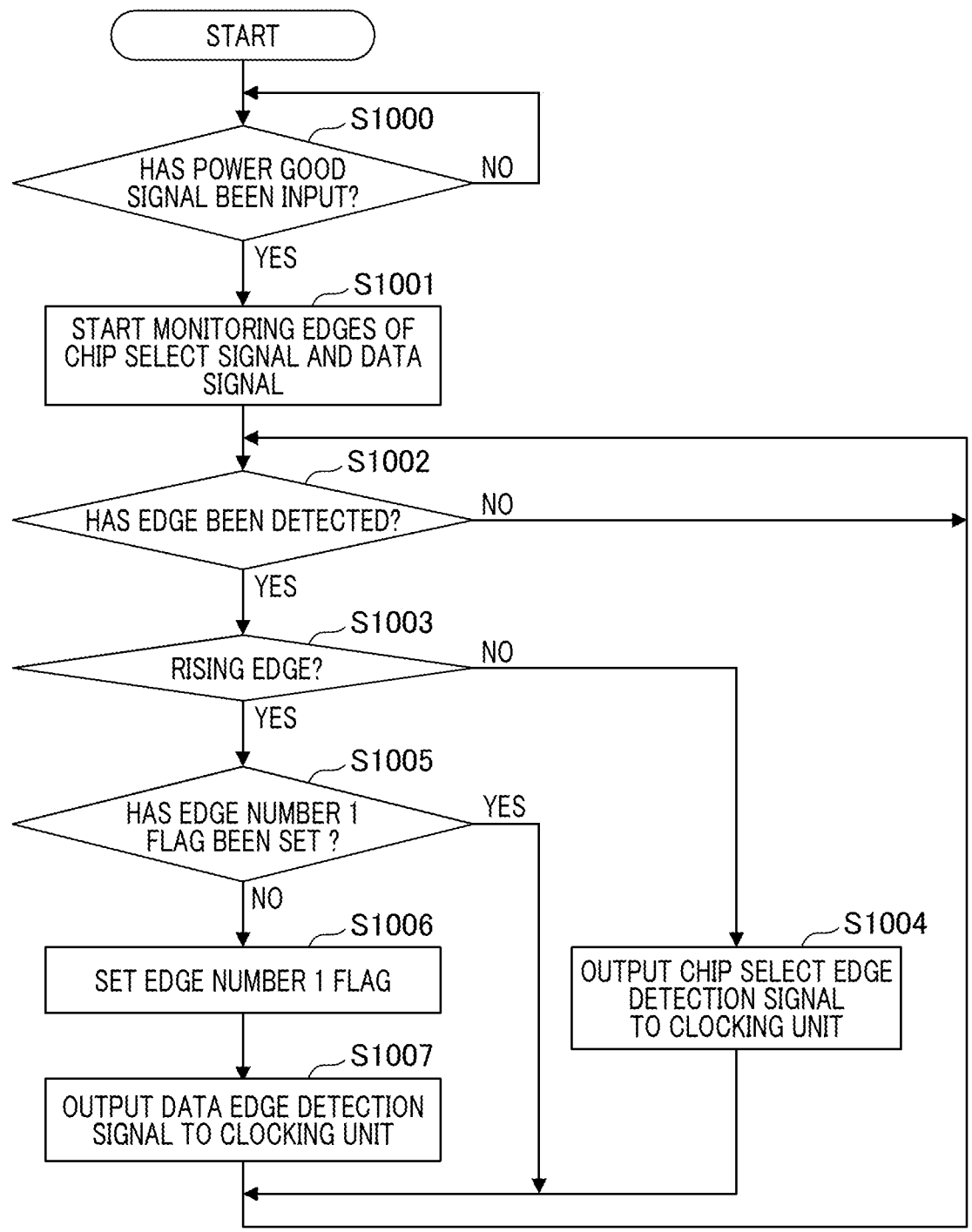
FIG. 14 is a flowchart that illustrates an operation process of an edge detection circuit.

FIG. 14 is a flowchart that illustrates the operation process of the edge detection circuit. In step S1000, the edge detection circuit 204 determines whether or not the Power Good signal 109 has been input from the power circuit 102. If the Power Good signal 109 has not been input from the power circuit 102, the process returns to step S1000. If the Power Good signal 109 has been input from the power circuit 102, the process proceeds to step S1001.

In step S1001, the edge detection circuit 204 starts monitoring the falling edge of the Chip Select signal output from the hard sequencer 101 and the rising edge of the data signal communicated between the hard sequencer 101 and the nonvolatile memory 104. Subsequently, in step S1002, it is determined whether or not the edge detection circuit 204 has detected the edge. If the edge detection circuit 204 has not detected the edge, the process returns to step S1002. If the edge detection circuit 204 has detected the edge, the process proceeds to step S1003.

In step S1003, the edge detection circuit 204 determines whether or not the detected edge is the rising edge. If the detected edge is the falling edge instead of the rising edge, the process proceeds to step S1004. Then, in step S1004, the edge detection circuit 204 transmits the Select edge detection signal to the clocking unit 205. If the detected edge is the rising edge, the process proceeds to step S1005.

In step S1005, the edge detection circuit 204 determines whether or not the edge-number-1 flag is set. The edge-number-1 flag indicates that the edge of the data signal communicated between the hard sequencer 101 and the nonvolatile memory 104 has already been detected. The case in which the edge-number-1 flag is not set indicates that the edge of the data signal communicated between the hard sequencer 101 and the nonvolatile memory 104 has been detected for the first time. Accordingly, if the edge-number-1 flag is not set, the process proceeds to step S1006. If the edge-number-1 flag is set, the process returns to step S1002, and the edge detection starts again.

Next, in step S1006, the edge detection circuit 204 sets the edge-number-1 flag. Subsequently, in step S1007, the edge detection circuit 204 outputs the data edge detection signal to the clocking unit 205. Then, the process returns to step S1002.

By the operation process described with reference to FIG. 14, the edge detection circuit 204 outputs the Select edge detection signal to the clocking unit 205 each time the edge detection circuit 204 detects the falling edge of the Chip Select signal. Additionally, in order to detect the failure of the nonvolatile memory 104, it suffices if the edge detection circuit 204 once detects the rising edge of the data signal communicated between the hard sequencer 101 and the nonvolatile memory 104. Therefore, the edge detection circuit 204 does not transmit the data edge detection signal each time the edge is detected.

Figure 15:
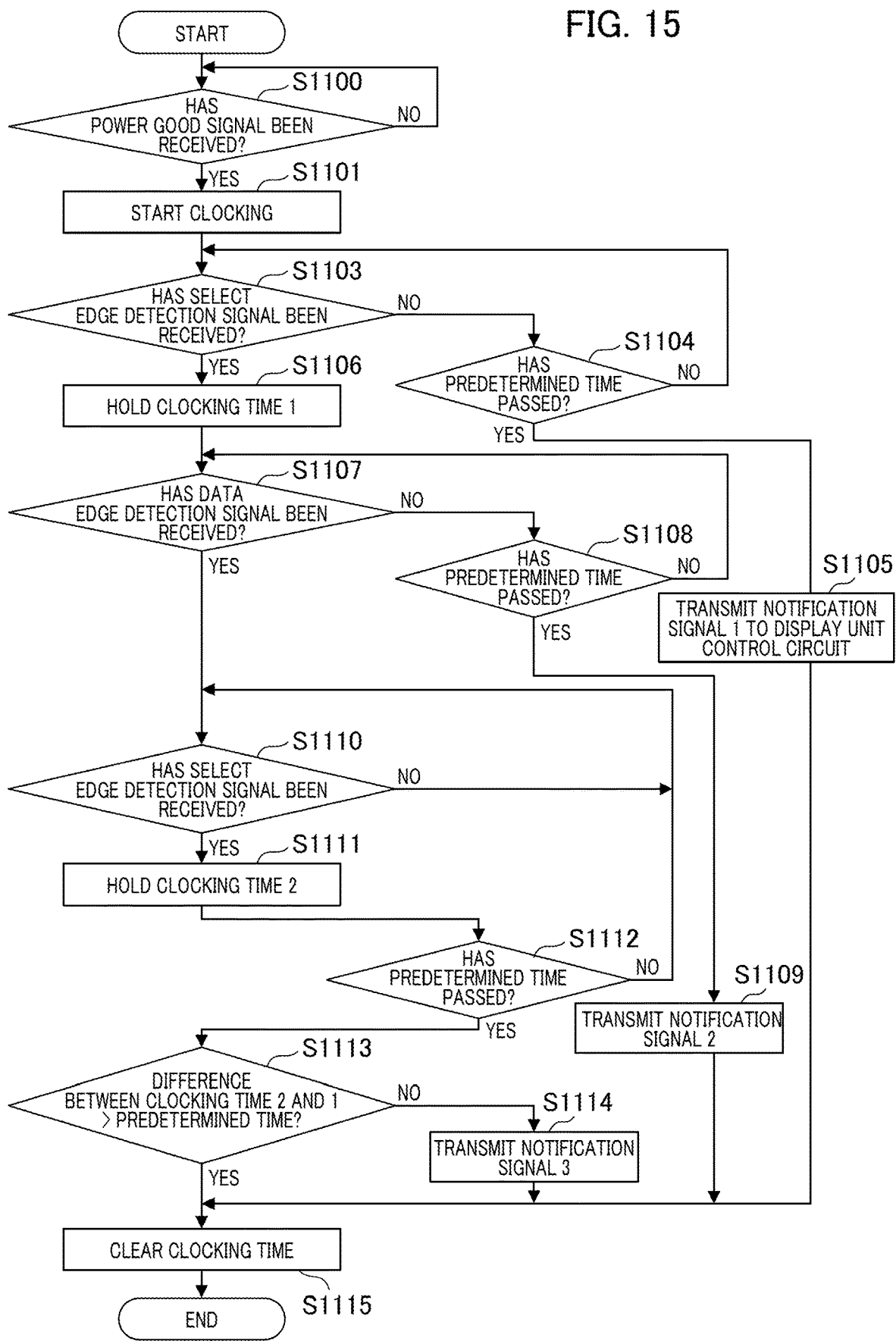
FIG. 15 is a flowchart that illustrates an operation process of the clocking unit.

FIG. 15 is a flowchart that illustrates the operation process of the clocking unit in the second embodiment.

In step S1100, the clocking unit 205 determines whether or not the Power Good signal 109 has been input from the power circuit 102. If the Power Good signal 109 has not been input from the power circuit 102, the process returns to step S1100. If the Power Good signal 109 has been input from the power circuit 102, the process proceeds to step S1101.

In step S1101, the clocking unit 205 starts clocking. Subsequently, in step S1103, it is determined whether or not the clocking unit 205 has received the Select edge detection signal from the edge detection circuit 204. If the clocking unit 205 has not received the Select edge detection signal, the process proceeds to step S1104. If the clocking unit 205 has received the Select edge detection signal, the process proceeds to step S1106.

In step S1104, the clocking unit 205 determines whether a predetermined time has passed. The predetermined time used in the determination process in step S1104 is the same as that used in the determination process in step S702 in FIG. 11, and is determined in accordance with the period of time for verifying the tampering of the boot program (the time of the first region). If the predetermined time has not passed, the process returns to step S1103. The case in which the predetermined time has passed indicates that the hard sequencer 101 does not output the Chip Select signal within the time of the first region. Accordingly, in this case, the clocking unit 205 determines that the start-up of the system has failed due to the failure of the hard sequencer 101, and the process proceeds to step S1105. Then, in step S1105, the clocking unit 205 outputs the notification signal 1 to the display unit control circuit 203.

In step S1106, the clock time when the clocking unit 205 has received the selected edge detection signal is held as clocking time 1. The clocking time 1 serves as the time when the first Chip Select signal has been detected. Subsequently, in step S1107, it is determined whether or not the clocking unit 205 has received the data edge detection signal from the edge detection circuit 204. If the clocking unit 205 has not received the data edge detection signal from the edge detection circuit 204, the process proceeds to step S1108. If the clocking unit 205 has received the data edge detection signal from the edge detection circuit 204, the process proceeds to step S1110.

In step S1108, the clocking unit 205 determines whether the predetermined time has passed. If the predetermined time has not passed, the process returns to step S1107. The case in which the predetermined time has passed indicates that the nonvolatile memory 104 has not transmitted the boot program data even though the hard sequencer 101 has output the Chip Select signal to the nonvolatile memory 104 within the time of the first region. Accordingly, in this case, the clocking unit 205 determines that the nonvolatile memory 104 has failed, and the process proceeds to step S1109. Then, in step S1109, the clocking unit 205 transmits the notification signal 2 to the display unit control circuit 203.

In step S1110, it is determined whether or not the clocking unit 205 has received the Select edge detection signal. If the clocking unit 205 has not received the Select edge detection signal, the process returns to step S1110. If the clocking unit 205 has received the Select edge detection signal, the process proceeds to step S1111. Then, in step S1111, the clocking unit 205 holds the clocking time when the selected edge detection signal is received as the clocking time 2.

Next, the clocking unit 205 determines whether or not the predetermined time has passed. If the predetermined time has not passed, the process returns to step S1110. Accordingly, the clock time 2 is overwritten each time the Select Edge Detection signal has been received, so that it is possible to always hold the time when the latest falling edge of the Chip Select signal has been detected. If the predetermined time has passed, the process proceeds to step S1113.

In step S1103, the clocking unit 205 calculates the time difference between the clock time 2 and the clock time 1, and determines whether or not the calculated time exceeds the predetermined time. The time difference between the clock time 2 and the clock time 1 is a time during which the Chip Select signal has been output. Accordingly, the case in which the time difference between the clock time 2 and the clock time 1 exceeds the predetermined time indicates communication between the hard sequencer 101 and the nonvolatile memory 104 is performed also in the regions subsequent first region. Therefore, in this case, the clocking unit 205 determines that the boot program has not been tampered and the process proceeds to step S1115.

The case in which the time difference between the clock time 2 and the clock time 1 is equal to or less than the predetermined time indicates that the hard sequencer 101 and the nonvolatile memory 104 has communicated only within the time of the first region. Hence, in this case, the clocking unit 205 determines that the start-up of the system has failed due to the tampering of the boot program and the process proceeds to step S1114. Then, in step S1114, the clocking unit 205 transmits the notification signal 3 to the display unit control circuit 203. Subsequently, in step S1115, the clocking unit 205 clears the clock time. According to the information processing apparatus in the second embodiment described above, it is possible to detect the cause of failure of the start-up of the system based on the monitoring result of the time during which the Chip Select signal is being output.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-243940, filed Dec. 20, 2017, which is hereby incorporated by reference wherein in its entirety.

What is claimed is:

1. An information processing apparatus comprising:
a memory configured to store a boot program for a system of the information processing apparatus;
a detection circuit configured to detect a tampering of the boot program stored in the memory;
a monitoring circuit configured to monitor a signal communicated between the detection circuit and the memory, count edges of the signal communicated between the detection circuit and the memory, and detect that a start-up of the system has failed due to the tampering of the boot program in a case where a number of the counted edges of the signal communicated between the detection circuit and the memory when a predetermined time, determined in accordance with a period of time for detecting the tampering of the boot program, has passed after clocking has started does not exceed a predetermined value; and
a notification circuit configured to provide notification of information related to a cause of failure of the start-up of the system, which is detected by the monitoring circuit.

2. The information processing apparatus according to claim 1,
wherein the signal communicated between the detection circuit and the memory includes a selection signal indicating that the detection circuit selects the memory as a communication target and a data signal communicated between the detection circuit and the memory.

3. The information processing apparatus according to claim 1,
wherein the monitoring circuit is further configured to detect that the start-up of the system has failed due to a failure of the detection circuit in a case where an edge of a selection signal indicating that the detection circuit selects the memory as a communication target is not detected when the predetermined time has passed after the clocking has started.

4. The information processing apparatus according to claim 1,
wherein the monitoring circuit is further configured to detect that the start-up of the system has failed due to a failure of the memory in a case where an edge of a data signal transmitted from the memory to the detection circuit has not been detected even though an edge of a selection signal indicating that the detection circuit selects the memory as a communication target has been detected when the predetermined time has passed after the clocking has started.

5. The information processing apparatus according to claim 1,
wherein, in a case where an edge of a selection signal indicating that the detection circuit selects the memory as a communication target and an edge of a data signal communicated between the detection circuit and the memory are detected when the predetermined time has passed after the clocking has started,
the monitoring circuit is further configured to determine whether or not a number of counted edges of the data signal communicated between the detection circuit and the memory exceeds a predetermined value, and
the monitoring circuit is further configured to detect that the system has normally started in a case where the number of counted edges of the data signal exceeds the predetermined value.

6. The information processing apparatus according to claim 5,
wherein, in a case where the number of counted edges of the data signal communicated between the detection circuit and the memory does not exceed the predetermined value, the monitoring circuit is further configured to determine whether a number of counted edges of the selection signal indicating that the detection circuit selects the memory as a communication target exceeds a first threshold value, and
in a case where the number of counted edges of the selection signal does not exceed the first threshold value, the monitoring circuit is further configured to detect that the start-up of the system has failed due to a failure of the detection circuit.

7. The information processing apparatus according to claim 6,
wherein, in a case where the number of counted edges of the selection signal exceeds the first threshold value, the monitoring circuit is further configured to determine whether or not the number of counted edges of the data signal communicated between the detection circuit and the memory exceeds a second threshold value, and
in a case where the number of counted edges of the data signal does not exceed the second threshold value, the monitoring circuit is further configured to detect that the start-up of the system has failed due to a failure of the memory.

8. The information processing apparatus according to claim 7,
wherein, in a case where the number of counted edges of the data signal exceeds the second threshold value, the monitoring circuit is further configured to detect that the start-up of the system has failed due to the tampering of the boot program.

9. The information processing apparatus according to claim 1,
wherein the monitoring circuit is further configured to detect and count one or more edges of the signal communicated between the detection circuit and the memory, and
in a case where the time from when a selection signal indicating that the detection circuit selects the memory as a communication target is firstly detected to when the selection signal is lastly detected exceeds a predetermined time, the monitoring circuit is further configured to detect that the start-up of the system has failed due to the tampering of the boot program.

10. The information processing apparatus according to claim 1,
wherein the detection circuit includes a CPU and the monitoring circuit includes a hardware circuit different from the CPU,
wherein the hardware circuit is further configured to monitor a signal between a memory connected to the CPU and the CPU, and detect that the start-up of the system has failed due to the tampering of the boot program based on a monitoring result of the signal, and
wherein the notification circuit is further configured to provide notification of information related to the cause of failure of the start-up of the system, which has been detected by the hardware circuit, to an output device connected to the hardware circuit.

11. A control method for an information processing apparatus comprising:
a memory configured to store a boot program for a system of the information processing apparatus; and
a detection circuit configured to detect a tampering of the boot program stored in the memory,
the method comprising:
monitoring a signal communicated between the detection circuit and the memory, counting edges of the signal communicated between the detection circuit and the memory, and detecting a start-up of the system has failed due to the tampering of the boot program in a case where a number of the counted edges of the signal communicated between the detection circuit and the memory when a predetermined time, determined in accordance with a period of time for detecting the tampering of the boot program, has passed after clocking has started does not exceed a predetermined value; and
providing notification of information related to a cause of failure of the start-up of the system, which has been detected in the monitoring.

12. A non-transitory storage medium on which is stored a computer program for making a computer execute a method for an information processing apparatus comprising:
a memory configured to store a boot program of a system of the information processing apparatus; and
a detection circuit configured to detect a tampering of the boot program stored in the memory,
the method comprising:
monitoring a signal communicated between the detection circuit and the memory, counting edges of the signal communicated between the detection circuit and the memory, and detecting a start-up of the system has failed due to the tampering of the boot program in a case where a number of the counted edges of the signal communicated between the detection circuit and the memory when a predetermined time, determined in accordance with a period of time for detecting the tampering of the boot program, has passed after clocking has started does not exceed a predetermined value; and providing notification of information related to a cause of failure of the start-up of the system, which has been detected in the monitoring.

\* \* \* \* \*